US007389276B1

(12) United States Patent
Barnard et al.

(10) Patent No.: US 7,389,276 B1
(45) Date of Patent: Jun. 17, 2008

(54) METHOD OF DETERMINING PRICING TO ENSURE PROFITABILITY

(75) Inventors: Keith Barnard, Helena, MT (US); Thomas Tschetter, Bellingham, WA (US); Thomas H. Good, West Bend, WI (US)

(73) Assignee: Profit Boost, LLC, Reno, NV (US)

( * ) Notice: Subject to any disclaimer, the term of this patent is extended or adjusted under 35 U.S.C. 154(b) by 405 days.

(21) Appl. No.: 10/941,127

(22) Filed: Sep. 15, 2004

Related U.S. Application Data

(60) Provisional application No. 60/504,649, filed on Sep. 18, 2003.

(51) Int. Cl.
*G06Q 99/00* (2006.01)
(52) U.S. Cl. .............................. 705/400; 705/1; 705/10; 705/11; 705/30; 705/400; 702/182
(58) Field of Classification Search ................. 705/400, 705/1, 10–11, 30; 702/182
See application file for complete search history.

(56) References Cited

U.S. PATENT DOCUMENTS

| 6,622,128 | B1 * | 9/2003 | Bedell et al. ................... 705/30 |
| 7,103,562 | B2 * | 9/2006 | Kosiba et al. ................... 705/10 |
| 2002/0010620 | A1 * | 1/2002 | Kowalchuk et al. ........... 705/10 |
| 2002/0016779 | A1 * | 2/2002 | Roll et al. ...................... 705/400 |
| 2002/0038235 | A1 * | 3/2002 | Musafia et al. ................ 705/11 |
| 2003/0050830 | A1 * | 3/2003 | Troyer ........................... 705/11 |
| 2003/0130883 | A1 * | 7/2003 | Schroeder et al. ............. 705/10 |
| 2003/0171981 | A1 * | 9/2003 | Bargnes et al. ................ 705/11 |
| 2004/0186765 | A1 * | 9/2004 | Kataoka ........................ 705/10 |

FOREIGN PATENT DOCUMENTS

JP 11353368 A * 12/1999

OTHER PUBLICATIONS

Taylor, Jacqueline; "Small Business / Setting your price: a 3-way approach", Mar. 23, 2003. p. 4 (3 pgs).*
Tayor, Iris; "How Do You Determine How Much To Charge?", Sep. 15, 2003, Richmond Times-Dispatch. Richmond Va., p D. 1, 2 pgs.*
"Setting Fees", May/Jun. 1978. vol. 11, Iss. 3 ; p. 29.*

(Continued)

*Primary Examiner*—John W Hayes
*Assistant Examiner*—Freda Ann Nelson
(74) *Attorney, Agent, or Firm*—Donald J. Ersler

(57) ABSTRACT

A method of determining pricing to ensure profitability for performance of a task by a business includes entry of employee data, business costs, job costs and business revenues; calculating a profit index factor from the data entered and providing ways of maximizing profit using the profit index factor as a baseline. The profit index factor is used as a baseline for performing analysis of operation profitability and performance; generating gross profit; and tracking profit on a job-by-job basis. The profit index factor is also used as a baseline for finding out how increasing operational expense will effect pricing; finding out increasing production staff will effect pricing; finding out how decreasing production staff will effect pricing; finding out the real burdened cost of billing one employee hour; and pricing service jobs to achieve or surpass a specific profit per hour target.

7 Claims, 31 Drawing Sheets

OTHER PUBLICATIONS

"How to access the ROI of your firm's administrative staff", Jun. 2003, vol. 03, Iss. 6; p. 3, (2pgs).*
Sehrt, John J. Jr, "Effective Law Office Financial Management", 1981-1982, HeinOnline, 17 Forum 522, pp. 522-532.*
Nagel, Stuart S., Attorney Time Per case: Finding an Optimum Level, 1979-1980, HeinOnline, 32 U. Fla L. Rev. 424, pgs.*
Bright, Lawrence R., "Is It Time To Adjust Your Fees?", 1983, HeinOnline, American Bar Association, 1426, pp. 1426-1431.*
V . Nagel, Stuart S., Attorney Time Per case: Finding an Optimum Level., 1979-1980, HeinOnline, 32 U. Fla L. Rev. 424, 18 pgs.*
W. Bright, Lawrence R., "Is It Time To Adjust Your Fees?", 1983, HeinOnline, American Bar Associaiton, 1426, 5 pgs. 1426-1431.*
"Andersen Unbound: Breaks old Auditing Ties Through Sweeping Organizational Overhaul", Oct. 8, 1990; Computer Systems News, p. 1, 4 pgs.*

* cited by examiner

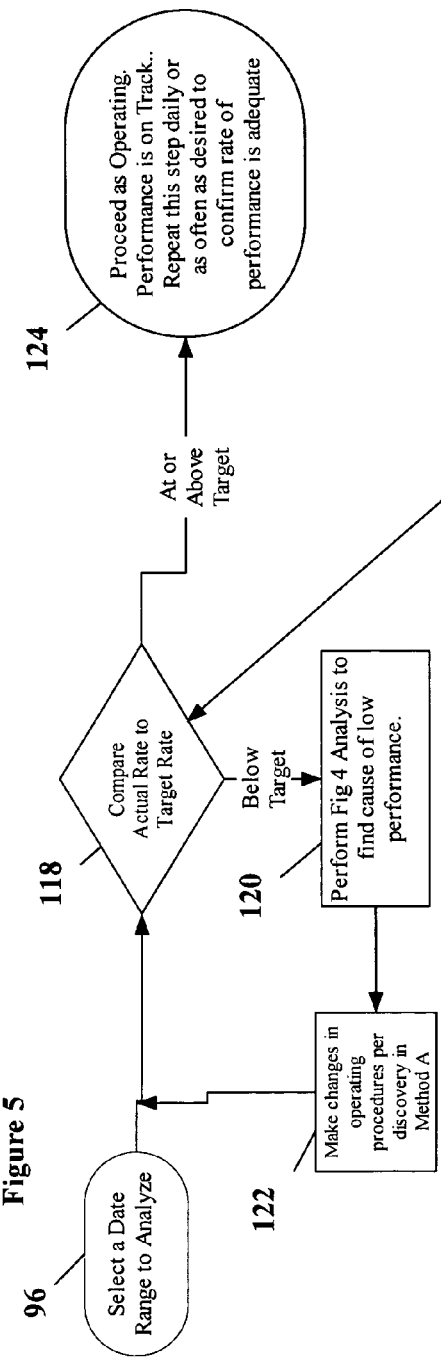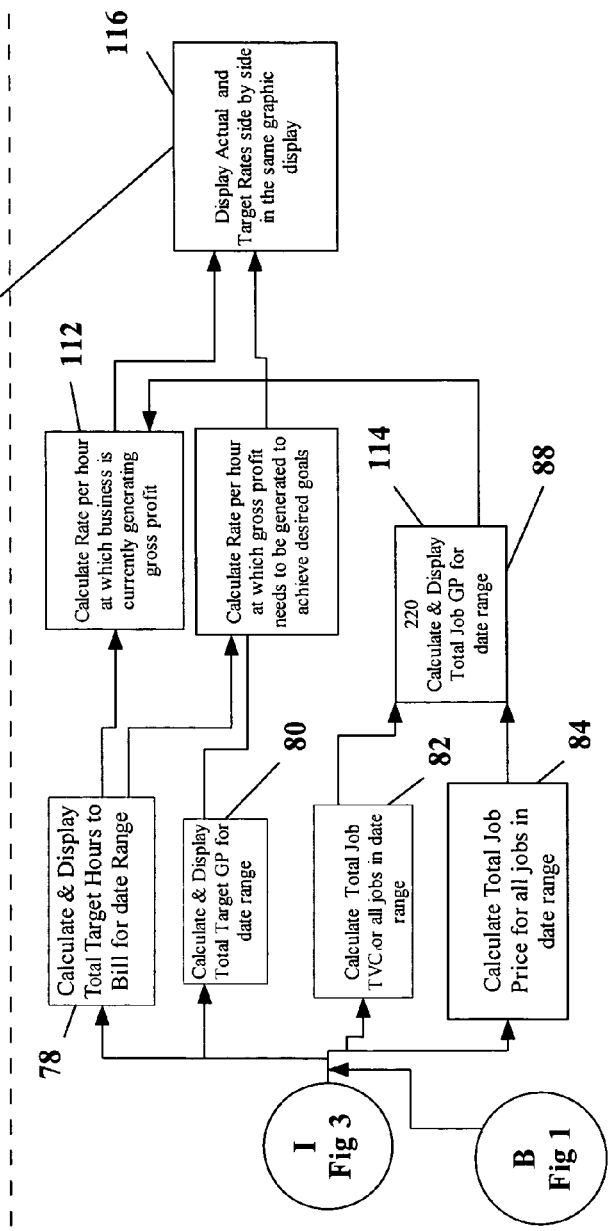
Figure 5

PIF - Monthly Sales Averages

User: Scott Johnson   Step Back

| | |
|---|---|
| Department: | Scotty's Transmission |
| Last Edit: | 07/30/2004 |
| Average January: | $60000.00 (7.64%) |
| Average February: | $60000.00 (7.64%) |
| Average March: | $65000.00 (8.28%) |
| Average April: | $65000.00 (8.28%) |
| Average May: | $65000.00 (8.28%) |
| Average June: | $70000.00 (8.92%) |
| Average July: | $70000.00 (8.92%) |
| Average August: | $75000.00 (9.55%) |
| Average September: | $75000.00 (9.55%) |
| Average October: | $70000.00 (8.92%) |
| Average November: | $60000.00 (7.64%) |
| Average December: | $50000.00 (6.37%) |

[Save Record]

Figure 16

| | | | | | |
|---|---|---|---|---|---|
| PIF PRO | | | Logout QMail Reports PIF Admin Help | | |
| | Search Appointments New RO QTicket Parts Time Clock Tech Activity RO/Job List | | | | |
| >> PIF - General Variable Form | | | User: Scott Johnson | | Step Back |

| | | | | | |
|---|---|---|---|---|---|
| Department: | Scotty's Transmission | | Reworks: | 8 | [?] |
| Last Edit: | 07/30/2004 | | Shop Cleanup: | 5 | [?] |
| Fica Percentage: | 7.65 % | [?] | Interruption Hrs: | 0 | [?] |
| Futa Percentage: | 0.8 % | [?] | Other Non Revenue Hrs: | 0 | [?] |
| Futa Limit: | 7000 (dollars) | [?] | | | |
| Suta Percantage | 3 % | [?] | Fiscal Year Begin: | 1 look up | [?] |
| Suta Limit: | 18800 (dollars) | [?] | Fiscal Year First Saturday: | 4 | [?] |
| Other Percentage: | 0 % | [?] | Burden Comm Techs: | 1.25 | [?] |
| Other Limit: | 0 (dollars) | [?] | Labor Rate: | 70 | [?] |
| | | | Diagnose Rate: | 70 | [?] |
| Royalties: | 0 % | [?] | Months Sales Hist to Avg: | 12 | [?] |
| Tax: | 0 % | [?] | Weeks to Look Back: | 52 | [?] |
| Salesman Commissions: | 0 % | [?] | | | |
| Techs Commissions: | 0 % | [?] | | | |
| % Paid Credit Card: | 40 % | [?] | | | |
| Credit Card Discount Rate: | 1.75 % | [?] | | | |
| % Paid Guaranteed Checks: | 0 % | [?] | | | |
| Check Guarantee Rate: | 0 % | [?] | | | |
| userdefined 1: | 0 % | [?] | | | |
| Total PVC %: | 0.7 | [?] | | | |

Save Record

Figure 17

PIF - Budgeted Cost - Debt Service - Profit Form

User: Scott Johnson

| Department: | Scotty's Transmission |
|---|---|
| Last Edit: | 07/30/2004 |
| ProductionWages: | $168854.40 |
| SupportStaffWages: | $0 |
| SalesAdminStaff: | $70592.5 |

| Field | Value |
|---|---|
| Advertising YP/Other | $21001 |
| Advertising Other | $0 |
| Facilities: Rent | $84000 |
| Repairs/Maintance | $5326 |
| Training | $2472 |
| Laundry & Uniforms | $4141 |
| Tools & Equipment | $4431 |
| Office Equipment | $0 |
| Insurance | $7500 |
| Vehicles & Fuel | $5628 |
| Dues & Subscriptions | $3972 |
| Legal & Accounting | $9043 |
| Office Supplies | $2894 |
| Phone | $7551 |
| Utilities | $10673 |
| Misc Tax & License | $3359 |
| 401K/Profit Sharing | $5919 |

| Field | Value |
|---|---|
| Waste Disposal | $2343 |
| Works Comp | $7854 |
| Janitorial | $1155 |
| Payroll Services | $2995 |
| Bad Debt | $1136 |
| Software | $1150 |
| Donations | $771 |
| Security System | $721 |
| Business Meetings | $864 |
| Bank Charges | $950 |
| Computer Service | $402 |
| Internet Services | $355 |
| Travel/Entertainment | $5343 |
| Promotional Jobs Allowance: | $0 |
| Non Labor Warranty Expense: | $1562 |
| Total Budgeted Cost: | $444957.9 |
| Debt Service: | $87000 |
| Total Budgeted w/ Debt: | $531957.9 |
| Desired Dollars Profit: | $50000 |
| Budget w/ Debt & Profit: | $581957.9 |

PIF - Production Overhead/Hours Form (POHF)

User: Scott Johnson

| Field | Value | | Field | Value |
|---|---|---|---|---|
| Technicians: | 4 | | Sub Total Annual Hour HVS and Non HVS: | 6858.7 |
| Annual Hours: | 8320 | | Annual Efficiency Adjustment: | -1834.71 |
| Annual Production Cost: | 168854.40 | | Total HoursTo Bill: | 5024.01 |
| Annual Benefit Contrib: | 8700.00 | | Hrs Adj Market Ability: | 0.00 |
| Annual Vacation Hours: | 200.0 | | Adjusted Total Hours To Bill: | 5024.0 |
| Annual Sick Hours: | 96.0 | | | |
| Annual Holiday Hours: | 144.0 | | | |
| Annual HVS Hours: | 440.0 | | | |
| Sub Total Annual Hours HVS: | 7880.0 | | | |
| Annual Paid Breaks: | 345.3 | | | |
| Annual Rework Hours: | 416.0 | | | |
| Annual Shop Cleanup: | 260.0 | | | |
| Annual Interruptions: | 0.0 | | | |
| Annual Other Non Revenue: | 0.0 | | | |
| Annual Non Hvs Reduction Hours: | 1021.3 | | | |

| | |
|---|---|
| Department: | Scotty's Transmission |
| Profit Hours: | 96.62 |
| Profit Baseline PIF: | 115.84 |
| Adjusted Profit PIF: | 115.84 |
| Break Even Hrs: | 96.62 |
| Break Even Baseline PIF: | 105.88 |
| Adjusted Break Even PIF: | 105.88 |
| Market ADJ Hours Per Week: | 0.00 |
| Profit Scenario Hours: | 109.00 |
| Profit Scenario PIF: | 102.67 |
| Profit Scenario AVG PIF: | 97.00 |
| Profit Scenario Sell Hours: | 115.38 |
| BE Scenario Hours: | 0.00 |
| BE Scenario PIF: | 0.00 |
| BE Scenario AVG PIF: | 179.00 |
| BE Scenario Sell Hours: | 57.15 |

Figure 22

| | | Scotty Test Copy | | Logout | QMail | Reports | PIF | Admin | Help |
|---|---|---|---|---|---|---|---|---|---|

>> Search / Browse          User: Scott Johnson    Step Back

1 Accounts   Account Search:
2 Vehicles
3 ROs
4 Jobs
5 Parts
6 Barcode

Account Name: johnson     Customer Type: All Types
Last Name:          License:
First Name:          VIN:
Phone:           OLD RO #:

If account not found after search scroll to bottom to create new.    Lookup

| | | | | | | |
|---|---|---|---|---|---|---|
| Johnson | Sam | Johnson | 3274 Valle.. | Sparks | NV | Personal |
| Johnson | Scott | Johnson | 4365 Valde.. | Reno | NV | Individual |
| Johnson | Scott | Johnson | | Sparks | NV | Individual |
| Johnson | Shannon | Johnson | P.o.box 21.. | Reno | NV | Individual |
| Johnson | Steve | Johnson | 3626 Clear.. | Reno | NV | Personal |
| Johnson | Terry | Johnson | 530 E. Pat.. | Reno | NV | Individual |
| Johnson | Thelma | Johnson | 619 Smithr.. | Reno | NV | Individual |
| Johnson | Tim | Johnson | Po Box 109.. | Truckee | CA | Individual |
| Johnson | Travis | Johnson | 2870 Snow.. | | | Individual |
| Johnson | Travis | Johnson | 2870 Partr.. | Reno | NV | Individual |
| Johnson | Trista | Johnson | 40 N. Patt.. | Sparks | NV | Individual |
| Johnson | Troy | Johnson | 33868 East.. | Corvallis | OR | Individual |
| Johnson | Tyson | Johnson | 2090 Baxte.. | Reno | NV | Personal |
| Johnson | W.I | Johnson | | Sparks | NV | Individual |
| Johnson Ind. Sheet Metal | Curt | Johnson | 2131 Barst.. | Sac | CA | Business |
| Johnson-perkins & Assoc. | Steve | Johnson | 295 Holcom.. | Reno | NV | Business |
| Johnson.alan | | Johnson.alan | 777 Starhi.. | Sparks | NV | Individual |

If Not Found Click Here to Create New

METHOD OF DETERMINING PRICING TO ENSURE PROFITABILITY

CROSS-REFERENCES TO RELATED APPLICATIONS

This is a utility patent application taking priority from provisional application No. 60/504,649 filed on Sep. 18, 2003.

BACKGROUND OF THE INVENTION

1. Field of the Invention

The present invention relates generally to profitability management and more specifically to a method of determining pricing to ensure profitability for a business.

2. Discussion of the Prior Art

It appears no software program exists in the art that provides a profitable selling price based on the operating budget and billable hours of a business. It further appears that no other software program calculates the operating budget for the business, allocates that budget per billable hour, tracks history and adjusts the allocation of the budget per billable hour based on accumulated variance, so as to keep the business on track to achieve a predetermined profit goal. However, there are other programs that offer profit calculations and profit analysis.

Topline's Alpha Wolf subtracts variable costs (parts and labor) from the sale price to calculate gross profit (GP), divides sales by the GP to arrive at a Cost Price Multiple (CPM), and compares the CPM to the target CPM entered in program configuration. It then warns if the sale price does not attain an adequate CPM to meet target. In addition, Alpha Wolf calculates and displays the GP per Billed Hour (BH), but it does not calculate the target GP/BH for the business or use the calculation to make comparison to a target.

Mitchell's OnDemand5 Manager/Manager Plus and RO Writer both offer Net Profit Analysis by calculating GP and additionally calculating business overhead using a fixed percentage of the total order. However, neither program offers complete operating budget calculating, nor do they automatically calculate and adjust for variance based on sales and cost history.

Accordingly, there is a clearly felt need in the art for a method of determining pricing to ensure profitability, which calculates the ratio of GP/BH for a business; calculates the ratio of GP/BH to make a comparison to a target; and calculates operating budget to adjust for variance based on sales and cost history.

SUMMARY OF THE INVENTION

The present invention provides a method of determining pricing to ensure profitability (method of ensuring profitability) for a business. The method of ensuring profitability includes entry into a software program of employee data, business costs, job costs and business revenues; calculating a profit index factor from the data entered and providing ways of maximizing profit using the profit index factor as a baseline. The employee data includes wages, salaries, commissions, hours worked, hours lost and vacation time. The business costs includes annual profit goal, projected fixed expenses, projected burdened costs of sales/administration staff and annual operational expenses.

The profit index factor is used as a baseline for performing analysis of operation profitability and performance; generating gross profit; and tracking profit on a job-by-job basis. The profit index factor is also used as a baseline for finding out how increasing operational expense will effect pricing; finding out how increasing production staff will effect pricing; finding out how decreasing production staff will effect pricing; finding out the real burdened cost of billing one employee hour; and pricing service jobs to achieve or surpass a specific profit per hour target.

Accordingly, it is an object of the present invention to provide a method of ensuring profitability, which calculates the ratio of GP/BH for a business.

It is a further object of the present invention to provide a method of ensuring profitability, which calculates the ratio of GP/BH to make a comparison to a target.

Finally, it is another object of the present invention to provide a method of ensuring profitability, which calculates operating budget to adjust for variance based on sales and cost history.

These and additional objects, advantages, features and benefits of the present invention will become apparent from the following specification.

BRIEF DESCRIPTION OF THE DRAWINGS

FIG. 5 is a flow chart of a method for determining and displaying graphically the rate at which an operation is generating gross profit and if that rate will likely allow the operation to achieve its desired goals.

FIG. 16 is a screen shot of a screen for entering sales history for calculating a seasonal sales curve percentage.

FIG. 17 is a screen shot of a screen for entering predictable variable costs, commissioned technician burden factor, annual operational expenses and other system configuration data.

FIG. 18 is a screen shot of a screen for entering annual profit goal and annual operating expense.

Figure 19:
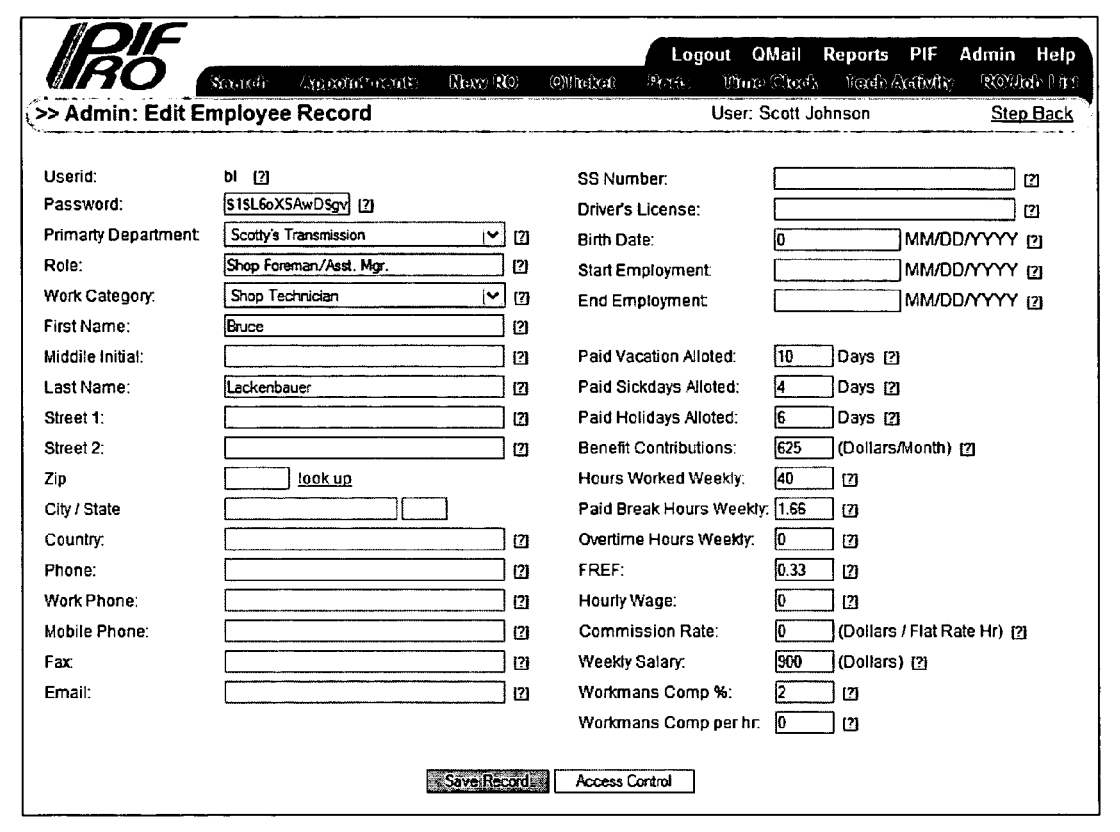

FIG. 19 is a screen shot of a screen for entering employee information including what work category they perform, such as production, support or sales, wages, salaries, commissions, hours at work, hours lost and flat rate efficiency factor.

FIG. 20 is a screen shot of a screen for reviewing annual production employee information and annual hours to bill.

FIG. 21 is a screen shot of a screen for reviewing key targets in a specific week; target hours; adjusted PIF; and entering adjustments for hours lost due to holiday, sick leave; and vacation.

FIG. 22 is a screen shot of a screen for reviewing target gross profit, target hours to bill baseline PIF and entering data to run some "what if" scenarios.

FIG. 23 is a screen shot of a screen for searching for account data, customer data or vehicle data records in data base(s).

FIG. 24 is a screen shot of a screen for creating and editing account, customer and vehicle data records.

FIG. 25 is a screen shot of a second screen for creating/editing repair orders and job record(s).

FIG. 26 is a screen shot of a screen for entering labor records.

FIG. 27 is a screen shot of a screen for searching part records and entering information related to the parts.

FIG. 28 is a screen shot of a screen for entering information concerning sublet items.

DETAILED DESCRIPTION OF THE PREFERRED EMBODIMENTS

Figure 1:
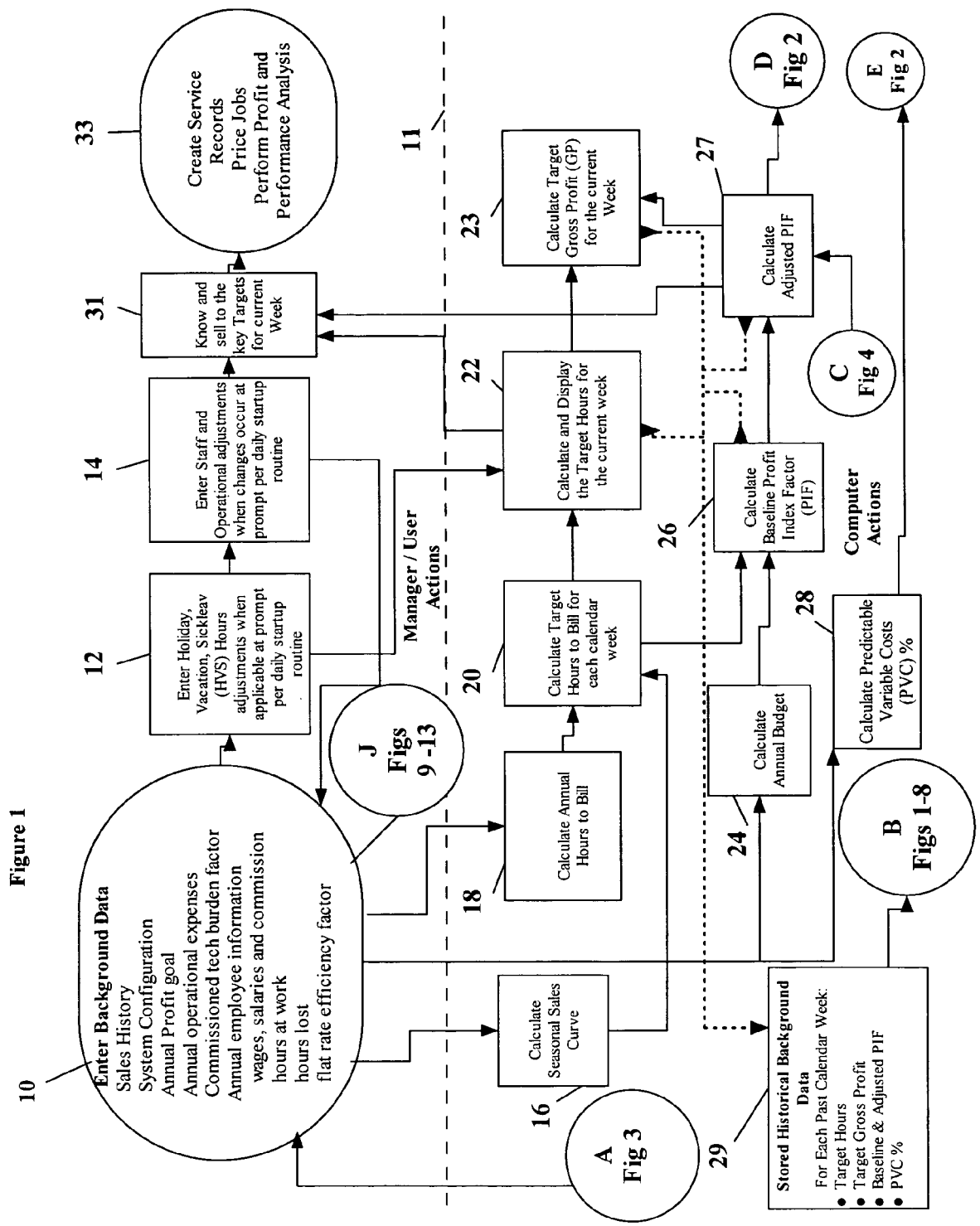
FIG. 1 is a first page of a flow chart of a method of pricing for profitability.

With reference now to the drawings, and particularly to FIG. 1, there is shown a flow chart of a method of pricing for profitability. The method of pricing for profitability includes the entry of various business related data to obtain a price that produces a profit to the business for performance of a task or perform some other type of profitability related analysis. The data of sales history, system configuration, annual profit goal, annual operational expenses, commissioned tech burden factor, annual employee information, wages, salaries, commission, hours at work, hours lost and flat rate efficiency factor are entered into start block 10.

Sales history is preferably entered in start block 10 through a software display screen illustrated in FIG. 16. System configuration, commissioned technician burden factor, lost hours for rework, shop cleanup, and interruptions and predictable variable costs are preferably entered in start block 10 through a software display screen illustrated in FIG. 17. Annual profit goal and annual operational expenses are preferably entered in start block 10 through a software display screen illustrated in FIG. 18. Wages, salaries, commissions, hours at work, hours lost and flat rate efficiency factor are preferably entered in start block 10 through a software display screen illustrated in FIG. 19. Annual employee information is reviewed in start block 10 through a software display screen illustrated in FIG. 20. A dashed line 11 is presented in FIGS. 1-15, blocks above the dashed line 11 require input or observation from a user and blocks below the dashed line 11 are actions performed within the software program.

Figure 21:
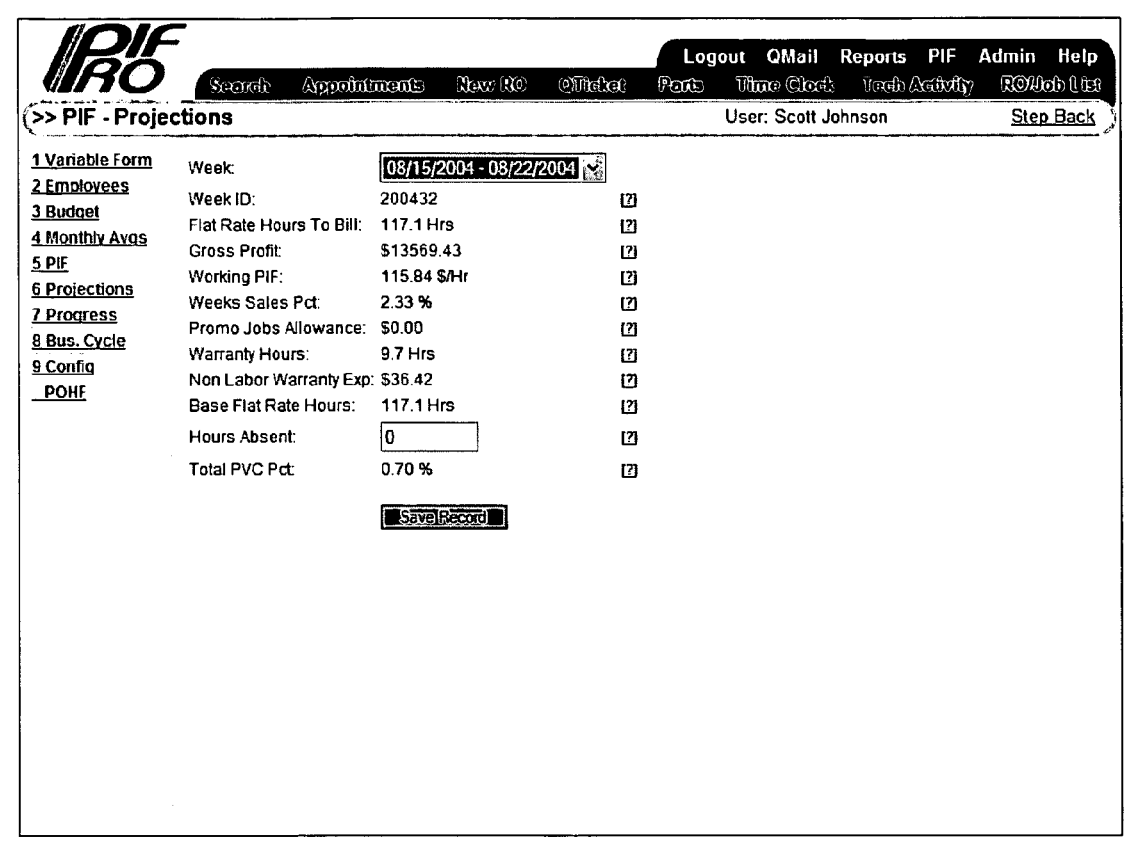

The entry of information concerning holiday, vacation and sick leave may be required daily in entry block 12 preferably through a software display screen illustrated in FIG. 21. The entry of information concerning staff and operational adjustments may be required daily in entry block 14. The data entered in start block 10 will be updated using the information in blocks 12 and 14. A seasonal sales curve percentage is defined as a calculation based on average sales volume that occurred historically during the same week/month of a calendar year. A seasonal sales curve percentage is calculated by dividing average sales revenue from a specific period of a calendar year by sales revenue for the full calendar year to arrive at a percentage of sales that occurred during each specific period of the calendar year in process block 16 using the data provided in entry block 10. The seasonal sales curve percentage is preferably entered in process block 16 through a software display screen illustrated in FIG. 16.

Annual hours to bill is defined as hours at work minus hours lost multiplied times staff flat rate efficiency factor. Annual hours to bill is calculated in process block 18 using the data provided in entry block 10. The annual hours to bill is reviewed through a software display screen illustrated in FIG. 20. Target hours to bill is defined as annual hours to bill multiplied by the seasonable sales curve for a particular period and minus hours lost to holidays, vacation and sick leave for the particular period. Target hours to bill for each calendar week is calculated in process block 20 using the data from process blocks 16 and 18.

Hours available to bill in the current week are calculated and displayed in process block 22 using the data from process blocks 12 and 20. Hours absent are preferably entered in process block 12 through the software display screen illustrated in FIG. 21. An annual budget is calculated in process block 24 using the data provided in entry block 10. Baseline profit index factor (baseline PIF) is defined as the annual budget divided by the annual hours. The baseline PIF is calculated in process block 26 using the data from process blocks 20 and 24. The baseline PIF is reviewed through the software display screen illustrated in FIG. 22.

Adjusted PIF is defined as the sum of annual budget plus accumulated variance divided by hours available to be billed. Without historical data, namely accumulated variance, adjusted PIF is equal to baseline PIF. Adjusted PIF is calculated in process block 27 and reviewed through the software display screen illustrated in FIG. 21. Target gross profit is defined as the adjusted PIF multiplied by target hours to bill. Target gross profit is calculated for a current week in process block 23 by using data from process blocks 22 and 27. The target gross profit is reviewed through the software display screen illustrated in FIG. 21.

Figure 30:
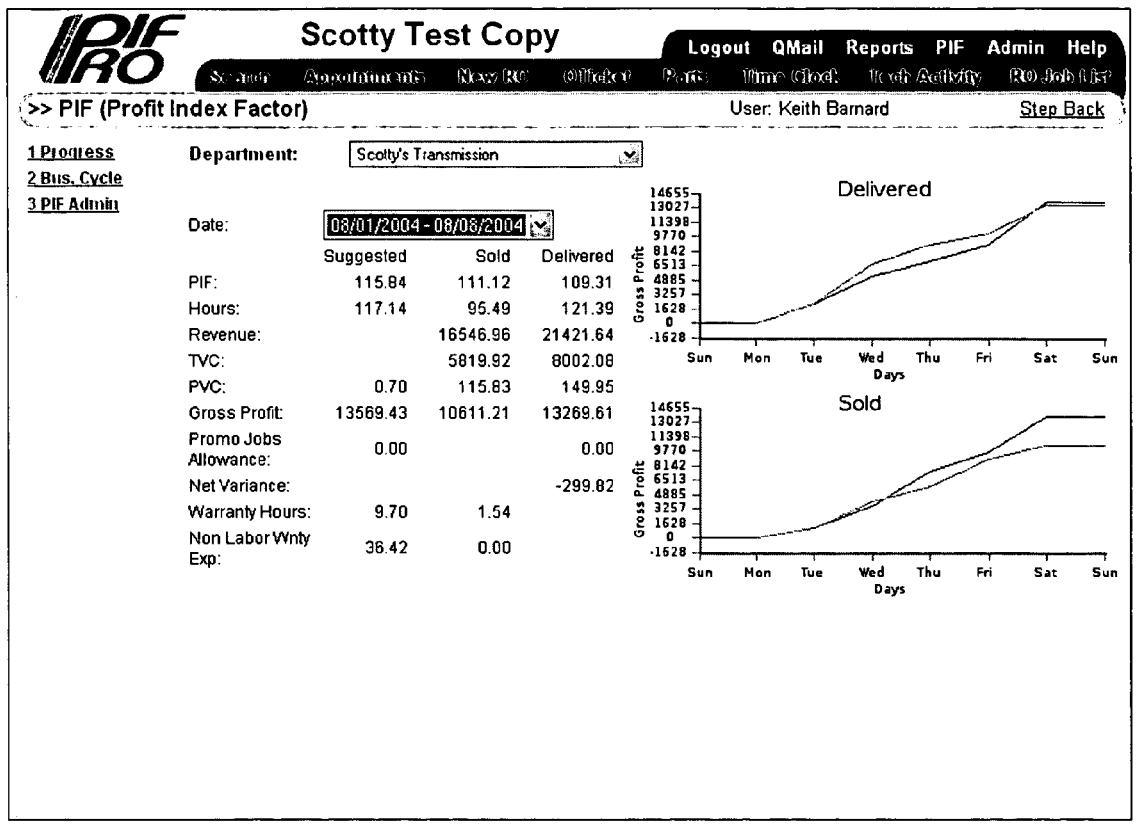
FIG. 30 is a screen shot of a screen for viewing profit and performance analysis of whether profit and performance goals were met in a single week.

Predictable variable costs are defined as costs that normally occur in direct proportion with sales, such as a franchise fee that is a portion of the gross revenues and are expressed as a percentage of sales. Predictable variable costs are derived in process block 28 using the data in entry block 10. The predictable variable costs are preferably entered through the software display screen illustrated in FIG. 17. Target hours, target gross profit, baseline PIF, adjusted PIF and predictable variable cost for each past calendar week is retained in storage block 29 as received from blocks 22, 23, 26 and 27. Information for pricing to a specific target is received in entry block 31 using data from blocks 22 and 27, and preferably reviewed through the software display screen illustrated in FIG. 21. The information received from storage block 29 is used to perform profit and performance analysis in display block 33, and reviewed through the software display screen illustrated in FIGS. 30 and 31.

Figure 2:
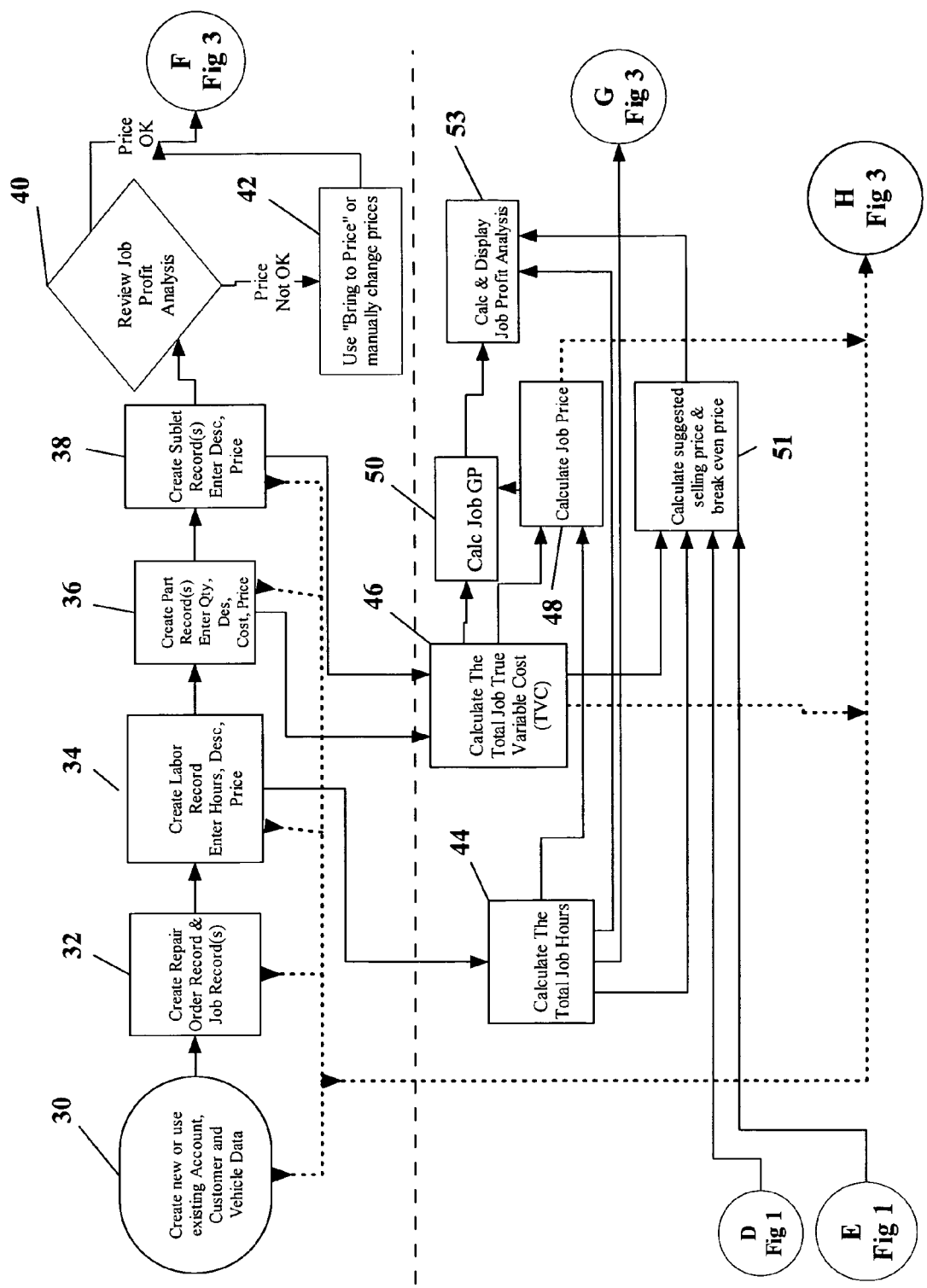
FIG. 2 is a second page of a flow chart of a method of pricing for profitability.
Figure 24:
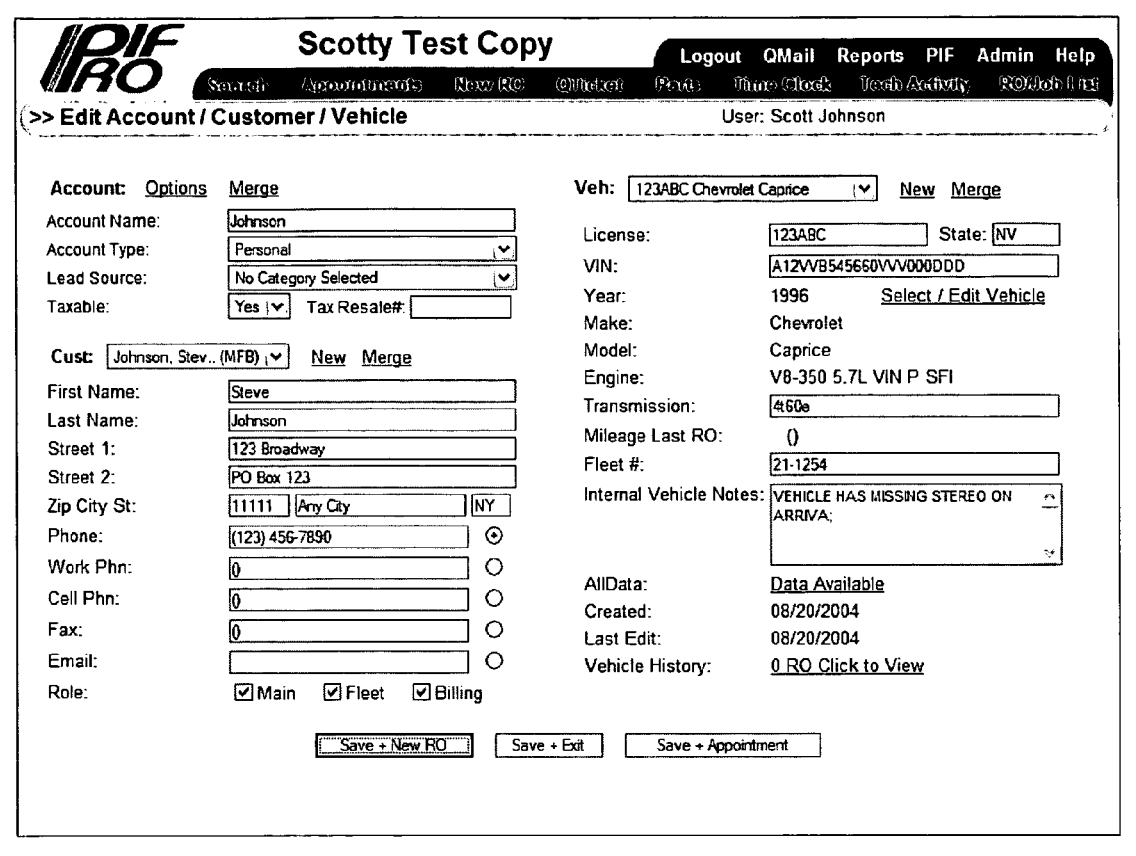
Figure 25:
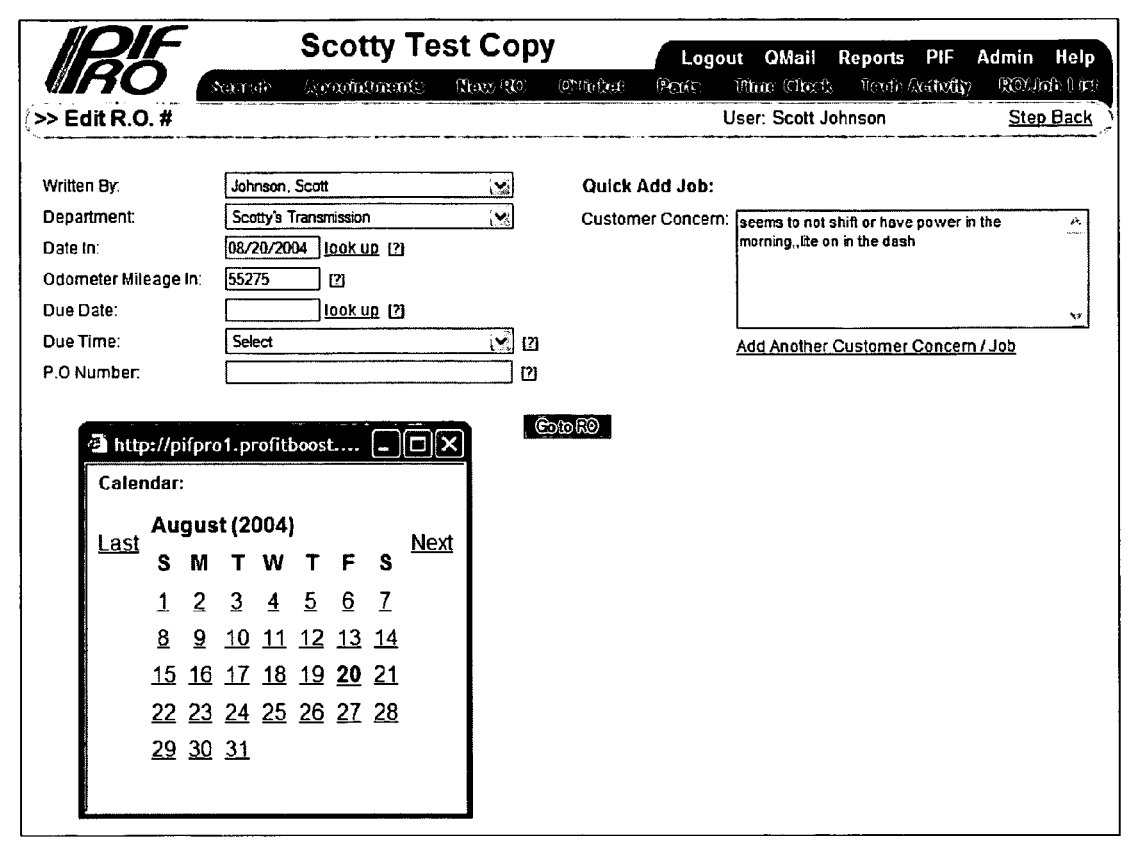

With reference to FIG. 2, new or existing account, customer or vehicle data is entered in entry block 30 through a software display screen illustrated in FIG. 24. The software display screen in FIG. 23 allows a user to search past records for customers and vehicles, prior to creating a new account or record. A repair order and job record are created in entry block 32 and preferably entered through software display screens illustrated in FIGS. 24 and 25. If a previous customer/vehicle record is not found, the user is automatically prompted to create a new account record. Vehicle information from existing reports is available for feature use in existing and new reports. The repair order captures vehicle mileage, customer complaint, expected item of and repair completion.

Figure 26:
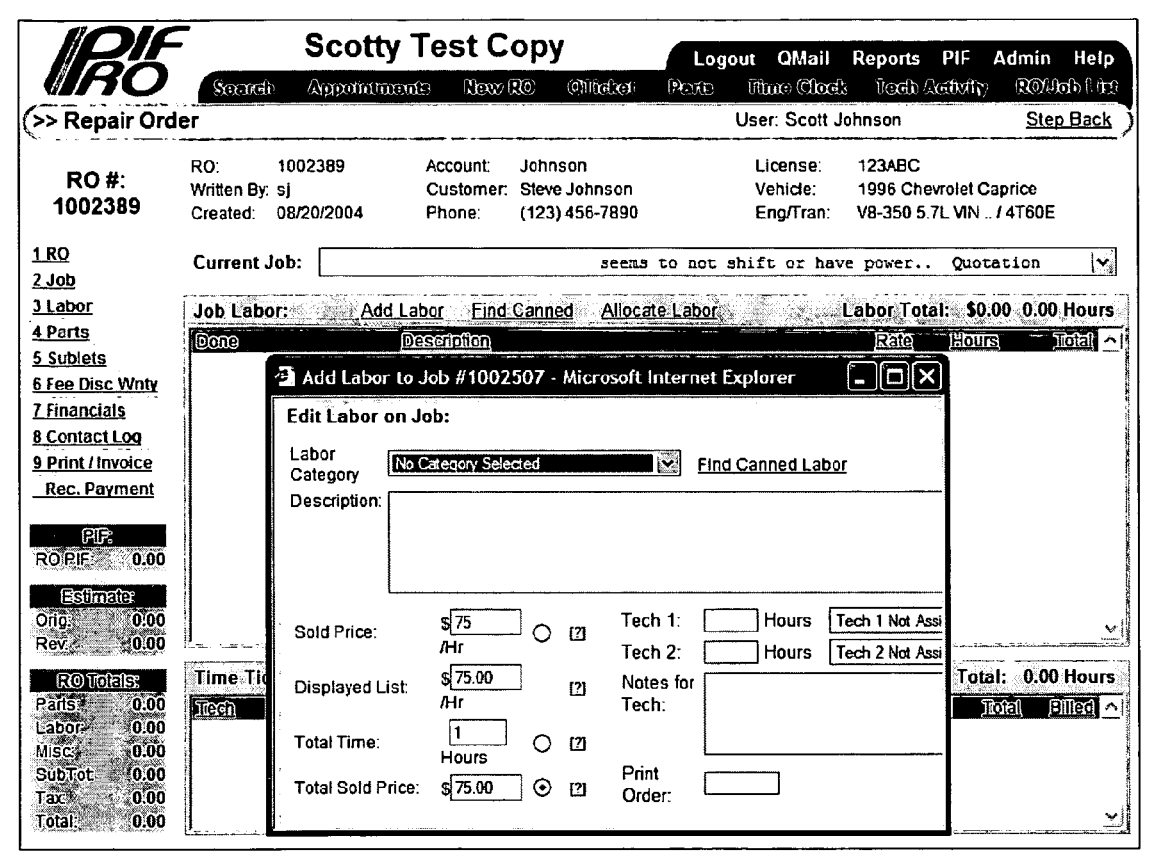
Figure 27:
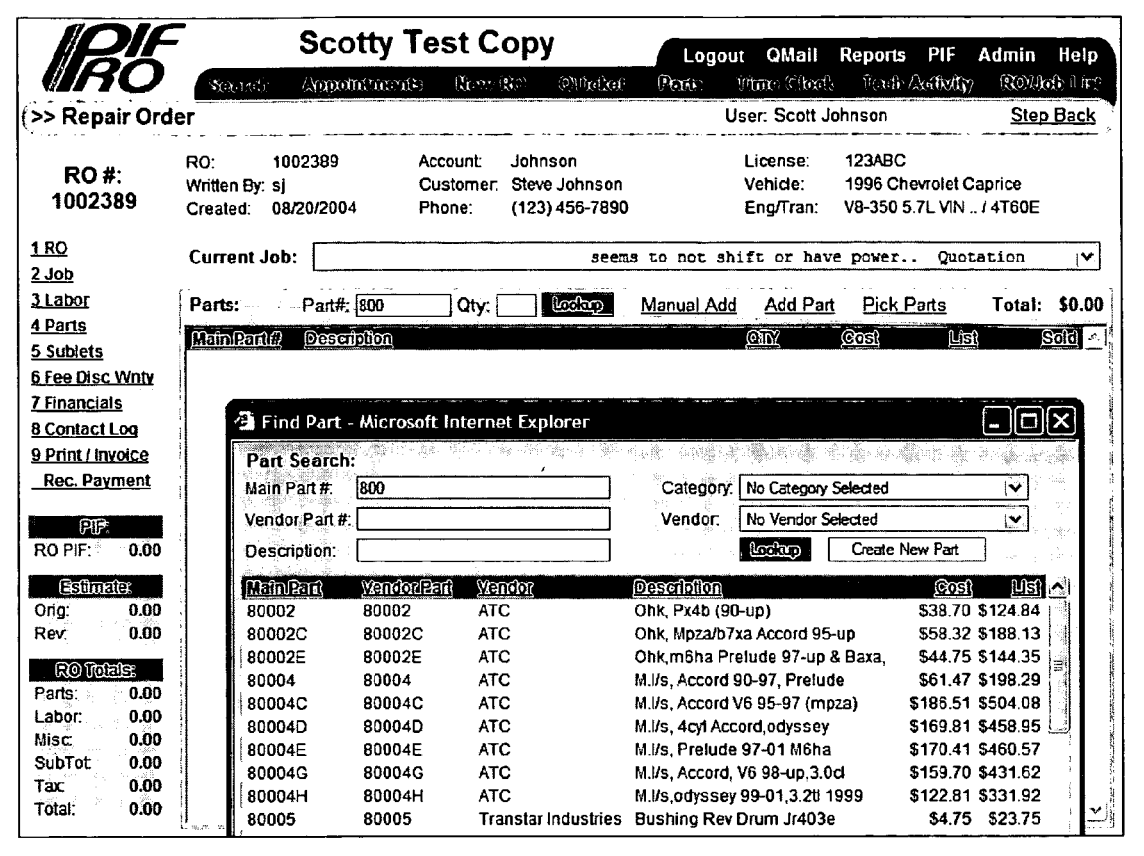

A labor record is created by entering hours, labor rate, description and hours worked in entry block 34. The labor record is preferably entered through a software display screen illustrated in FIG. 26. The software display screen in FIG. 26 allows adding multiple labor descriptions, manipulating hours, manipulating rate per hour and assignment to a particular employee. A part record is entered in entry block 36 including quantity description, cost and price preferably through a software display screen illustrated in FIG. 27. The software display screen in FIG. 27 allows for searching a vendors database for part records; picking parts to enter on a job; specifying quantity of parts and editing costs, prices, markup and margins.

Figure 28:
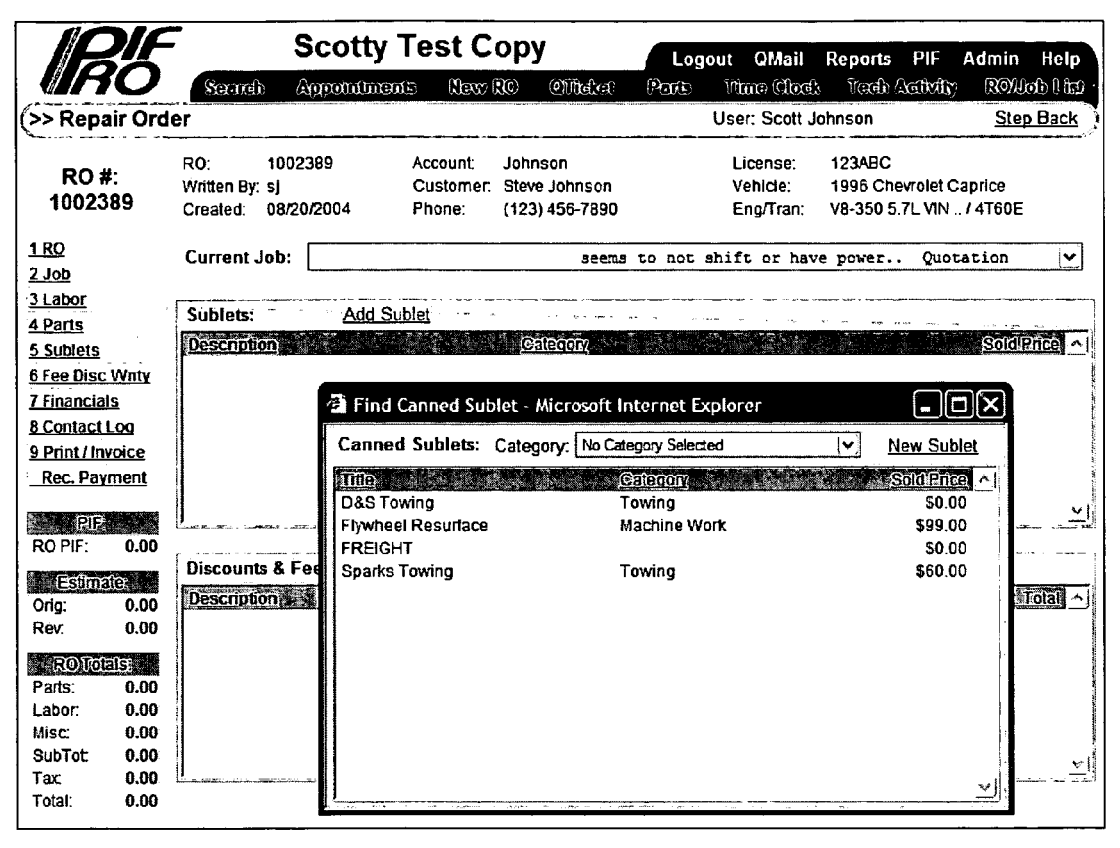
Figure 29:
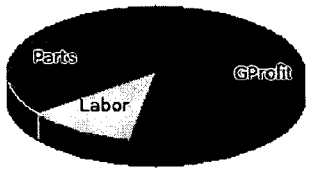
FIG. 29 is a screen shot of a screen for viewing real time analysis of the profit associated with a task based upon the current price of the job, the hours consumed from the available hours to sell and the variable costs associated with the job.

A sublet record is created in entry block 38 including description and price. The sublet record is preferably entered through a software display screen illustrated in FIG. 28. The software display screen in FIG. 28 allows for adding outside services (sublets) to a repair order. The software display screen in FIG. 28 also allows adding fees based upon user defined parameters such as hazardous waste, disposal or shop supplies. Fees can be set-up by a user based on flat amount, percentage of labor or parts as a total of the job. Job profit is calculated in decision block 40 using the data from blocks 30, 32, 34, 36 and 38. The job profit analysis is preferably illustrated through a software displayed screen in FIG. 29. If the price does not produce a satisfactory profit, the user can use the "Bring to PIF price feature" or manually change prices in block 42.

Total job hours are calculated in process block 44 using the data from entry block 34. Total job true variable cost (job TVC) is defined as the total cost of materials, sublets and the burdened employee labor that are required for completing a job. The total job true variable cost is calculated in process block 46 from entry blocks 36 and 38. The total job true variable cost is preferably illustrated in the software display screen in FIG. 29. The job gross price is calculated in process block 48 using data from process blocks 44 and 46. The job gross profit is calculated in process block 50 using data from process blocks 46 and 48. The job gross profit is preferably illustrated through the software display screen in FIG. 29. Selling price and break even price are calculated in process block 51 using data from blocks 27, 28, 44 and 46. The selling price and break even price are preferably illustrated in the software display screen in FIG. 29. Job profit analysis is calculated and displayed in process block 53 using data from blocks 44, 50 and 51.

Figure 3:
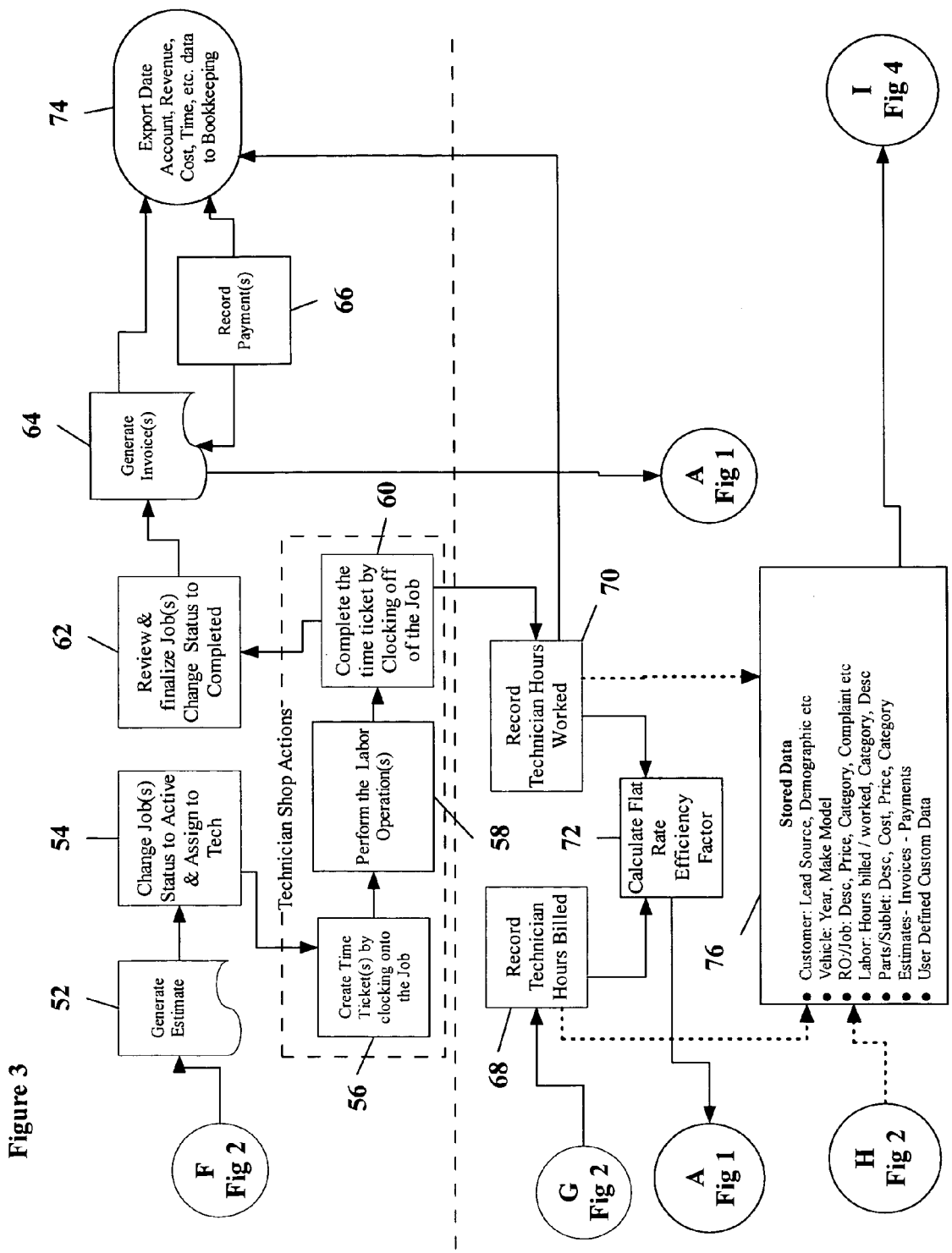
FIG. 3 is a third page of a flow chart of a method of pricing for profitability.

With reference to FIG. 3, an estimate is generated in display block 52 from decision block 40. The option of changing job status to active is chosen by a manager in entry block 54. A time ticket is created by clocking on to the job in entry block 56. An employee performs the labor operation in process block 58. The time ticket is completed in entry block 60 by clocking off of job in entry block 60. The job is finalized and the status changed to complete by a manager in entry block 62. An invoice is generated in process block 64 for payment in block 66.

The employee hours are recorded in entry block 68 with the total job hours from process block 44. The number of hours worked by the employee are recorded in entry block 70. A flat rate efficiency factor is defined as the hours billed divided by the hours worked. The flat rate efficiency factor is calculated in process block 72 from process blocks 68 and 70. Date, account, revenue, cost, time and other data is exported to bookkeeping in export block 74 using data from blocks 64, 66 and 70. Customer information, vehicle information, job information, labor information, part information, billing information and any other customized data is retained in storage block 76 as received from blocks 30, 32, 34, 36, 38, 46, 48, 68 and 70.

Figure 4:
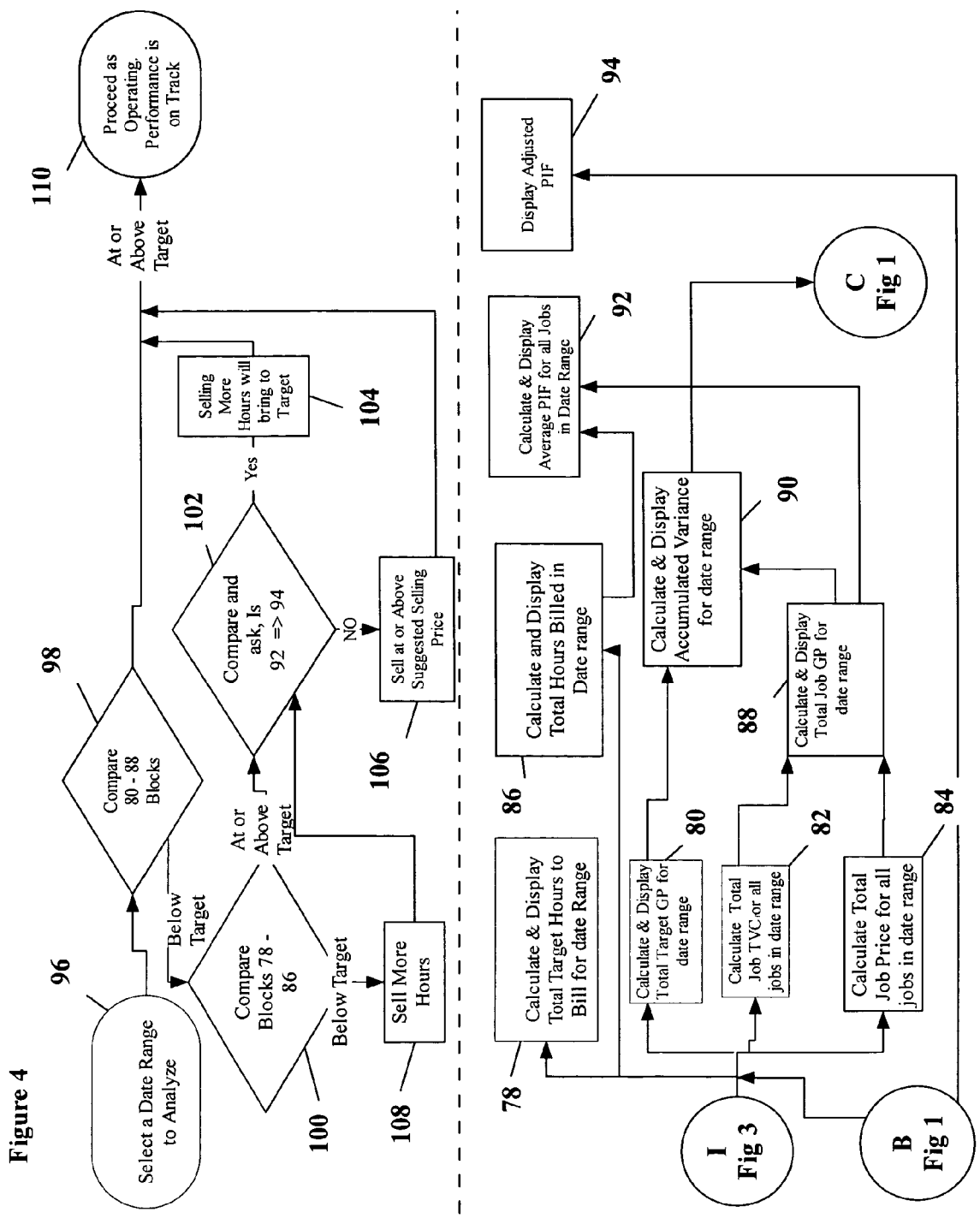
FIG. 4 is a flow chart of a method of performing analysis of operation profitability and performance.

With reference to FIG. 4, a method for performing analysis of operational profitability and performance is presented. Information from storage blocks 29 and 76 are utilized to calculate and display total target hours to bill for a particular date range in process block 78. Information from storage blocks 29 and 76 are utilized to calculate and display total target gross profit for a particular date range in process block 80. Information from storage blocks 29 and 76 are utilized to calculate total job TVC for all jobs in a particular date range in process block 82. Information from storage blocks 29 and 76 are utilized to calculate job price for all jobs in a particular date range in process block 84. Information from storage blocks 29 and 76 are utilized to calculate and display total hours billed in a particular date range in process block 86.

Figure 31:
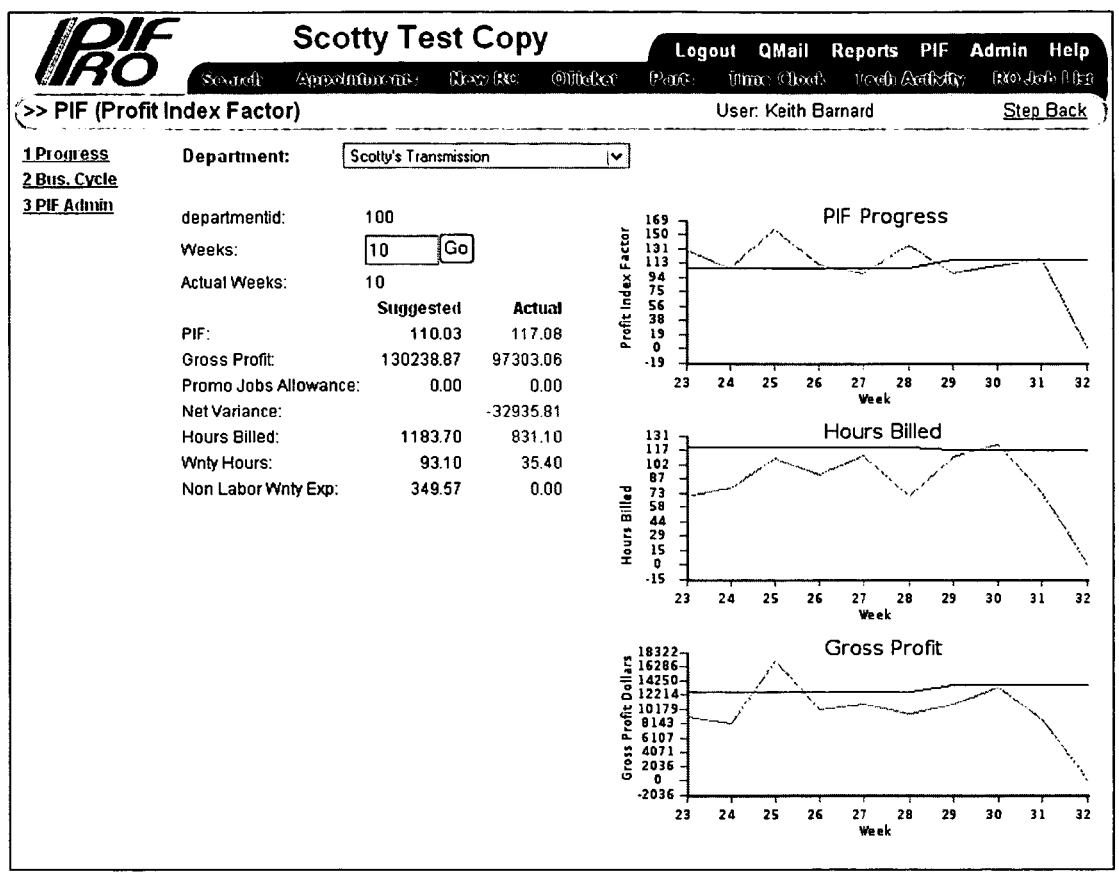
FIG. 31 is a screen shot of a screen for viewing profit and performance analysis of whether profit and performance goals were met in multiple weeks.

Total job gross profit for a particular date range is calculated in process block 88 utilizing data from process blocks 82 and 84. Accumulated variance is defined as the difference between target gross profit and actual gross profit. The accumulated variance for a particular date range is calculated and displayed in process block 90 utilizing data from process blocks 80 and 88 and is illustrated in FIG. 31. Average PIF for all jobs for a particular date range is calculated in process block 92 using data from process blocks 86 and 88. Average PIF is displayed in display block 94 and is illustrated in FIG. 31.

Operational profitability and performance may be analyzed for a particular date range in 96. The difference between total target gross profit and actual gross profit is observed in decision block 98. If accumulated variance is below target, then compare total target hours to total hours billed in a particular date range in decision block 100. If total hours billed is at or above target then compare average PIF for all jobs with adjusted PIF in decision block 102. If average PIF is equal to or greater than adjusted PIF, then display "selling more hours will bring to target" in display block 104. If average PIF is not equal to or greater than adjusted PIF, then display "sell at or above suggested selling price of a job in display block 106. Finally, display "proceed as operating, performance is on track" in display block 110. If total hours billed is below target in decision block 100, then display "sell more hours" in display block 108.

With reference to FIG. 5, a method for determining and displaying graphically the rate at which an operation is generating gross profit and if that rate will likely allow the operation to achieve its desired goals is presented. The rate per hour at which a business is currently generating a gross profit is calculated in process block 112 using data from process blocks 78 and 88. The rate per hour at which gross profit needs to be generated to achieve desired goals is calculated in process block 114 using data from process blocks 78 and 80.

Actual and target rates are displayed side by side in display block 116 and is illustrated in FIG. 31.

Actual and target rates are compared to each other in decision block 118 using data from display block 116. If the actual rate is below the target rate then perform method analysis in FIG. 4 to find the cause of low performance in process block 120. Operating changes are made according to the method analysis performed in FIG. 4 in process block 122. If the operating changes in process block 122 project a hourly rate that is greater than the target hourly rate, or if the actual rate is greater than the target rate in decision block 118, then display "proceed as operating, performance is on track" in display block 124. The method for determining profitability of an hourly rate in FIG. 5 may be repeated daily or as often as desired.

Figure 6:
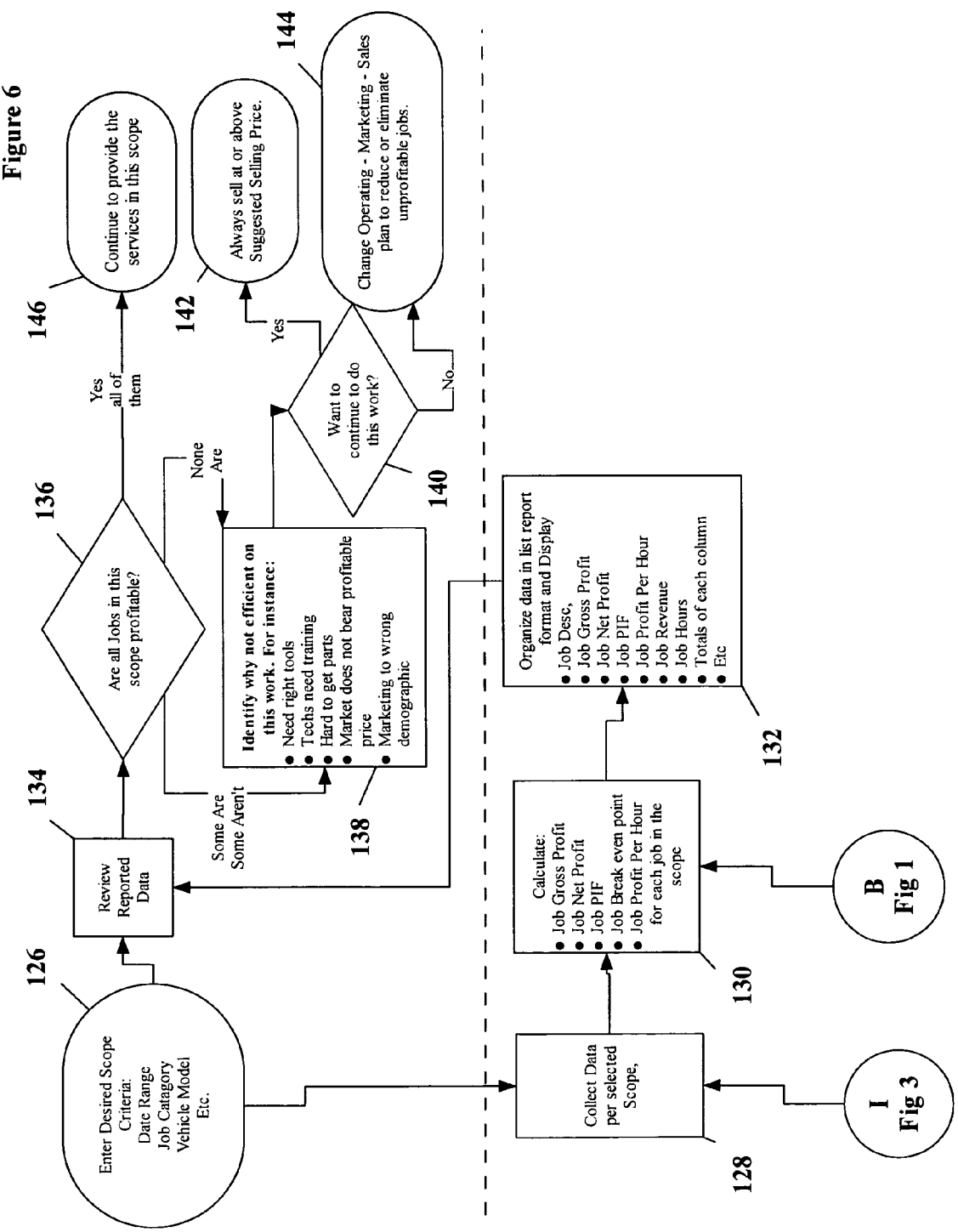
FIG. 6 is a flow chart of a method for tracking profit on a job-by-job basis.

With reference to FIG. 6, a method for tracking profit on a job-by-job basis is presented. Relevant job information, such as job category, vehicle model, date range are entered in entry block 126. Data from storage block 76 and entry block 126 are collected per selected scope in process block 128. Job gross profit, job net profit, job PIF, job break even point and job profit per hour for each job in the scope is calculated in process block using data from process block 128 and storage block 29. Job PIF is the amount of job gross profit divided by the number of hours billed for the job. Job description, job gross profit, job net profit, job PIF, job profit per hour, job revenue, job hours and totals of each column are organized in a list report and displayed in process block 132.

The report generated in process block 132 is reviewed in display block 134. The question of are "all jobs in the scope profitable" is asked in decision block 136. If none or some of jobs are profitable then ask the following questions in question block 138: "not efficient on this work," "need right tools," "employees need more training," "hard to get parts," "market doesn't bear a profitable price" and "marketing to wrong demographic." Ask the following question in decision block 140, "want to continue to do this work?" If the answer is yes, then "always sell at or above suggested selling price" in answer block 142. If the answer is no, then "change operating-marketing-sales plan to reduce or eliminate unprofitable jobs" in answer block 144. If all jobs in the scope are profitable, then "continue to provide the services in this scope" in answer block 146.

Figure 7:
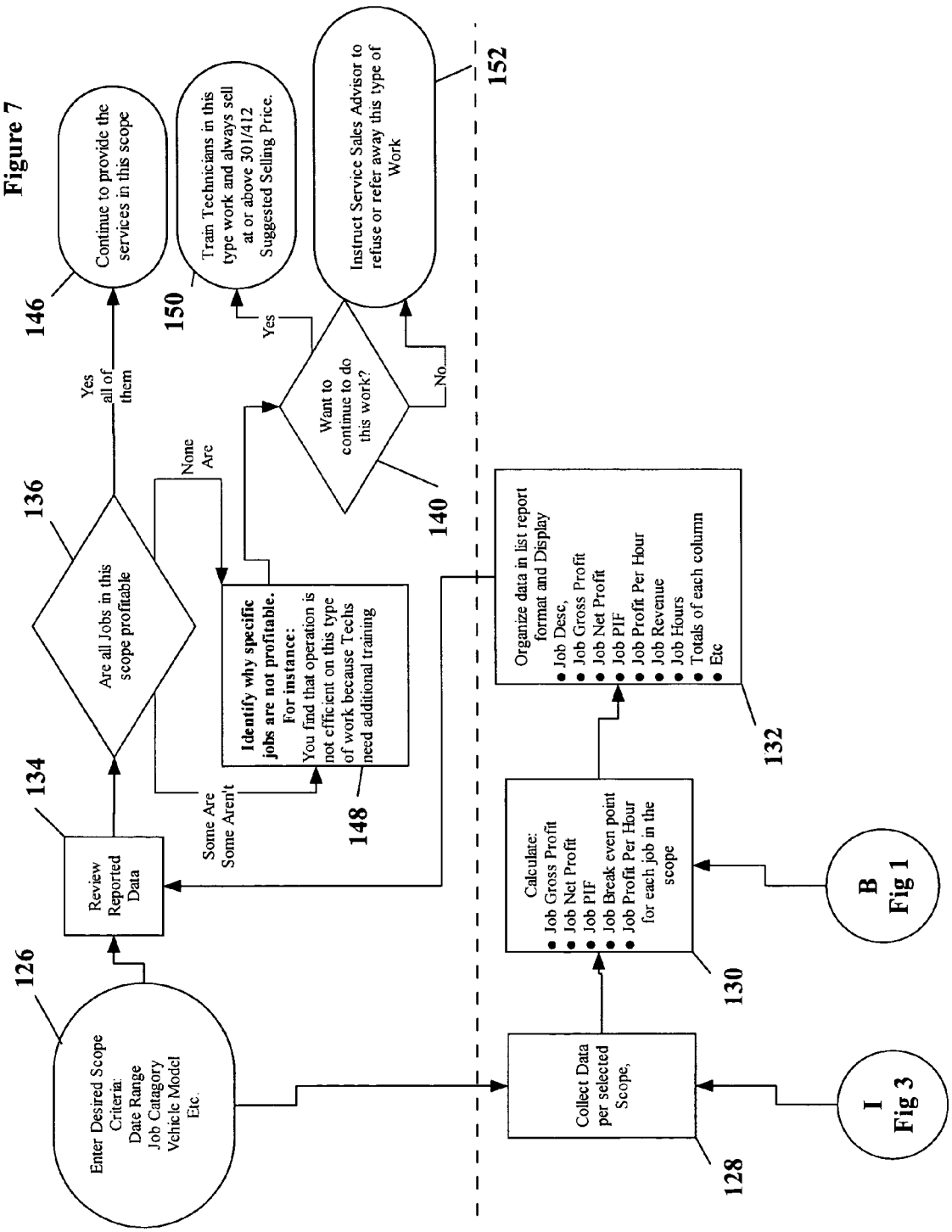
FIG. 7 is a flow chart of a second method for tracking profit on a job-by-job basis.

With reference to FIG. 7, a second embodiment of a method for tracking profit on a job-by-job basis is presented. If none or some of jobs are profitable in decision block 136, then "Identify why specific jobs are not profitable. For instance: You find that operation is not efficient on this type of work, because employees need additional training" in question block 148. If the answer to the question in decision block 140 is yes, then "train technicians in this type of work and always sell at or above suggested selling price" in answer block 150. If the answer to the question in decision block 140 is no, then "instruct service sales advisor to refuse or refer away this type of work" in answer block 152.

Figure 8:
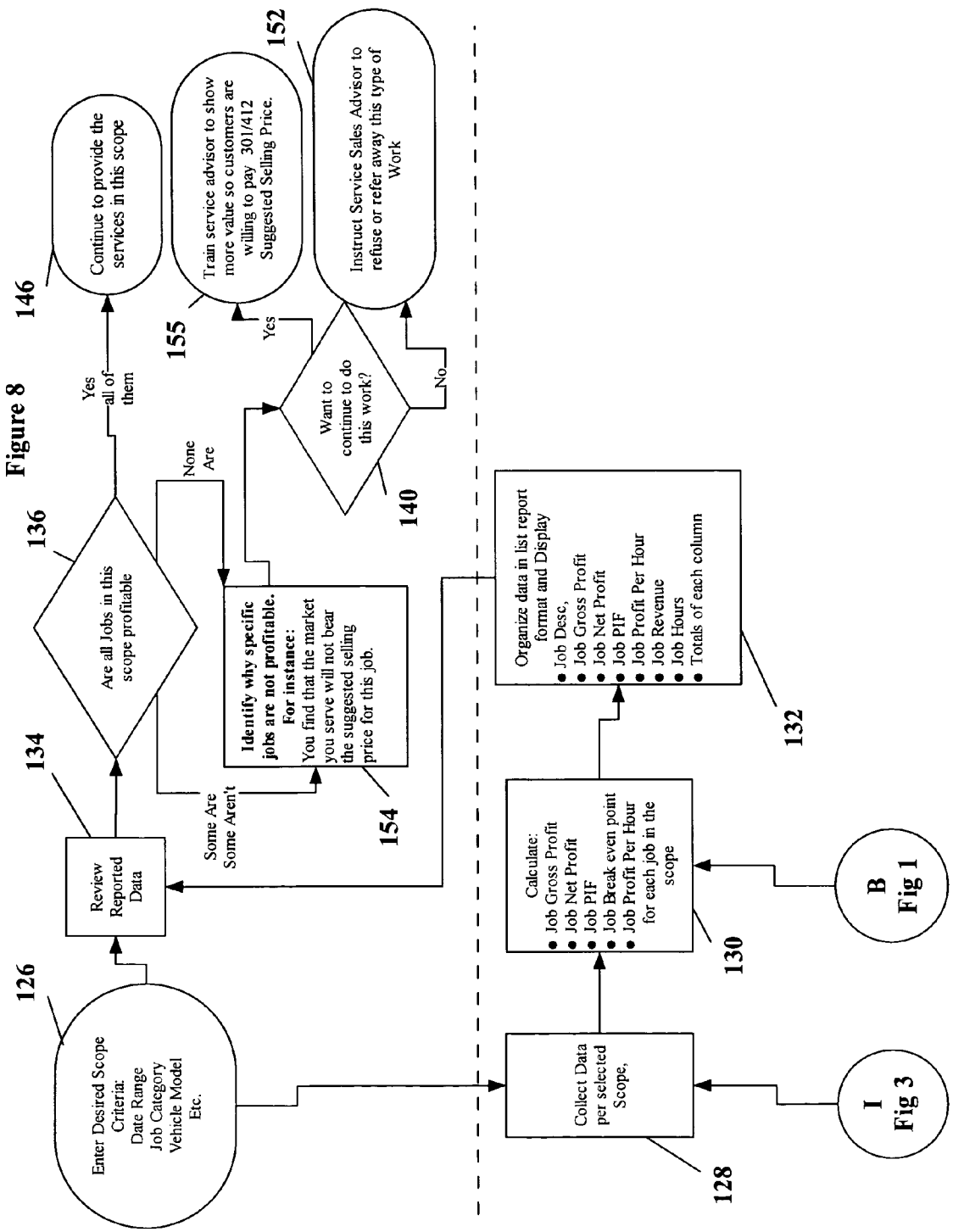
FIG. 8 is a flow chart of a third method for tracking profit on a job-by-job basis.

With reference to FIG. 8, a third embodiment of a method for tracking profit on a job-by-job basis is presented. If none or some of jobs are profitable in decision block 136, then "Identify why specific jobs are not profitable." For instance: You find that the market you serve will not bear the suggested selling price for this job" in question block 154. If the answer to the question in decision block 140 is yes, then "train service advisor to show more value so customers are willing to pay suggested selling price" in answer block 155.

Figure 9:
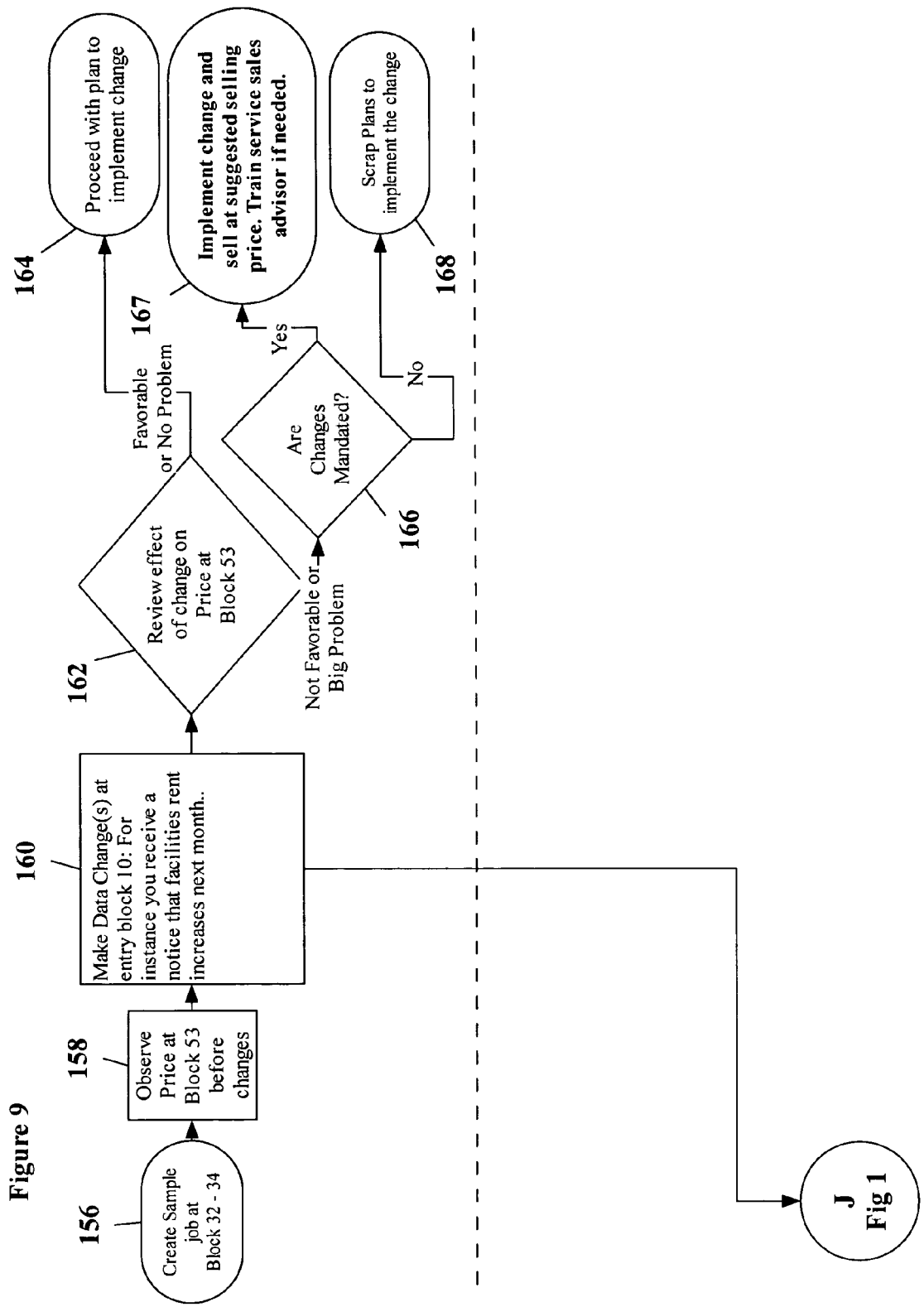
FIG. 9 is a flow chart of a method to find out how increasing operational expense will effect pricing.

With reference to FIG. 9, a method to find out how increasing operational expense will effect pricing is presented. A sample job is created by entering the type of job, the amount of hours required to perform the job and parts required for the job and any other applicable information in entry block 156. Display "observe price according to average PIF before changes occur" in display block 158. Display "make data changes at entry block 10: for instance, you receive a notice that rent increase next month." Enter the rent increase as an operational expense" in display block 160. After entering data changes in entry block 10, review the change in average PIF relative to price in decision block 162. If change to average PIF is favorable, then display "proceed with plan to implement change in display block 164. If change to average PIF is not favorable, then ask the question are "changes mandated" in decision block 166. If changes are mandated, then display "implement change and sell at suggested selling price. Train service sales advisor if needed." in display block 167. If changes are not mandated, then display "scrap plans to implement the change" in display block 168.

Figure 10:
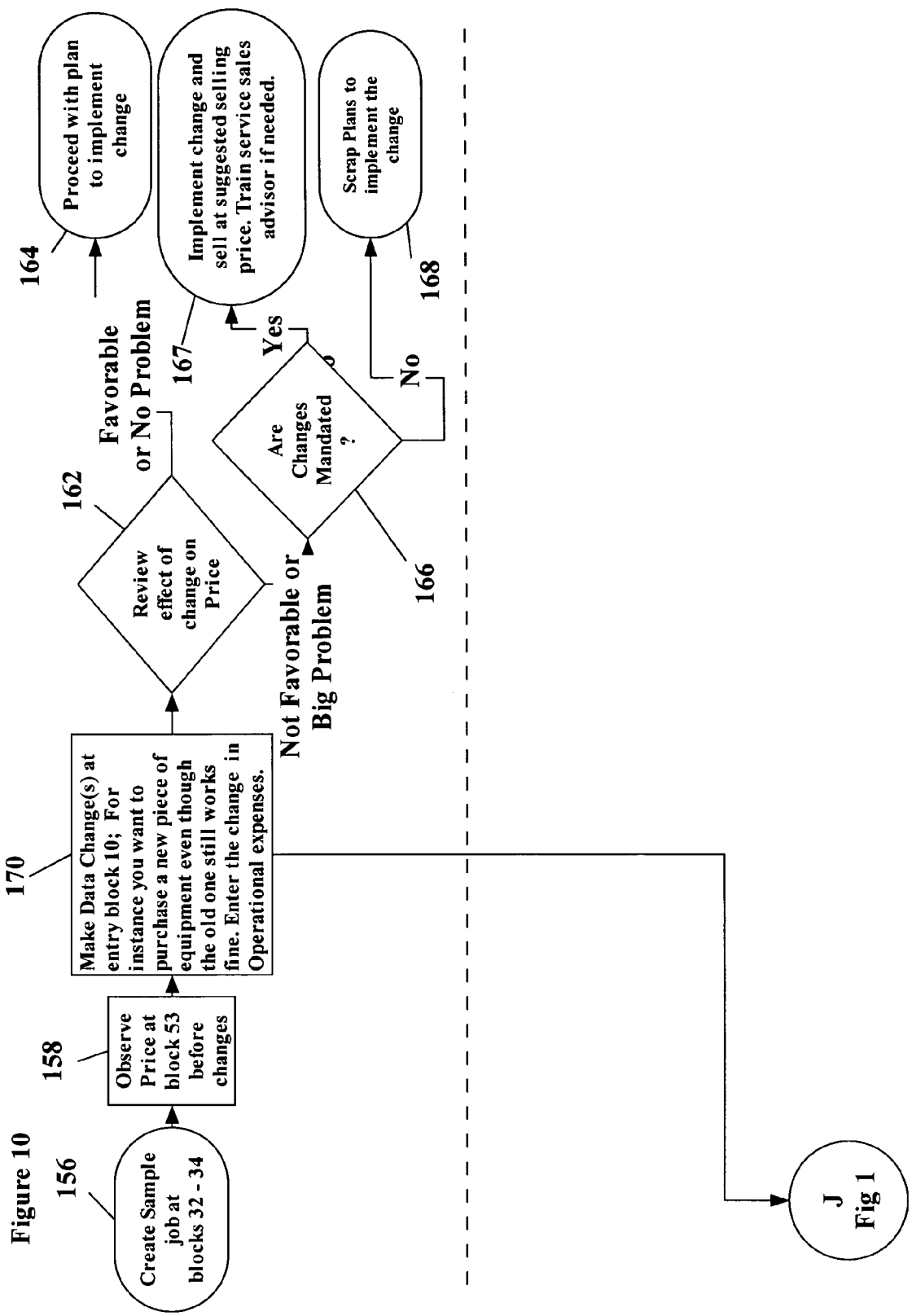
FIG. 10 is a flow chart of a second method to find out how increasing operational expense will effect pricing.

With reference to FIG. 10, a second embodiment of a method to find out how increasing operational expense will effect pricing is presented. Display "make data changes at entry block 10: for instance, you want to purchase a new piece of equipment even though the old one still works fine. Enter the change in operational expense" in display block 170. Go through the same remaining analysis as shown in FIG. 9.

Figure 11:
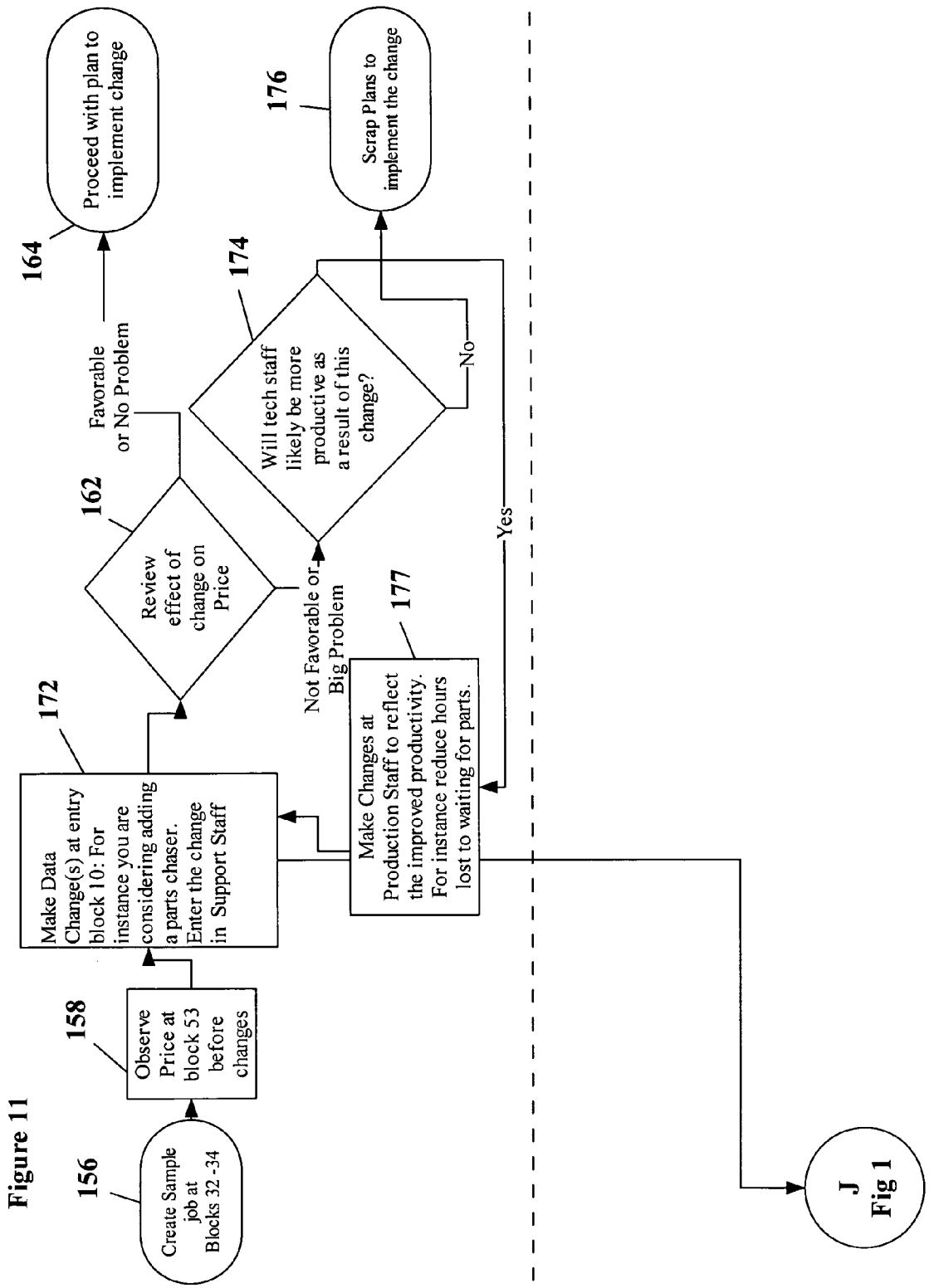
FIG. 11 is a flow chart of a third method to find out how increasing operational expense will effect pricing.

With reference to FIG. 11, a third embodiment of a method to find out how increasing operational expense will effect pricing is presented. Display "make data changes at entry block 10: for instance, you are considering adding a parts chaser. Enter the change in support staff" in display block 172. If change to average PIF is not favorable in decision block 162, then display "will technical staff likely be more productive as a result of change" in decision block 174. If the answer to the question in decision block 174 is no, then display "scrap plans to implement the change" in display block 176. If the answer to the question in decision block 174 is yes, then display "enter changes in production staff to reflect the improved productivity. For instance reduce hours lost to waiting for parts" in display block 177. The program will go back to decision block 162 to determine, if the change in production staff will have a favorable effect on price as related to average PIF. If a favorable effect in decision block 162, then display "proceed with plan to implement change" in display block 164.

Figure 12:
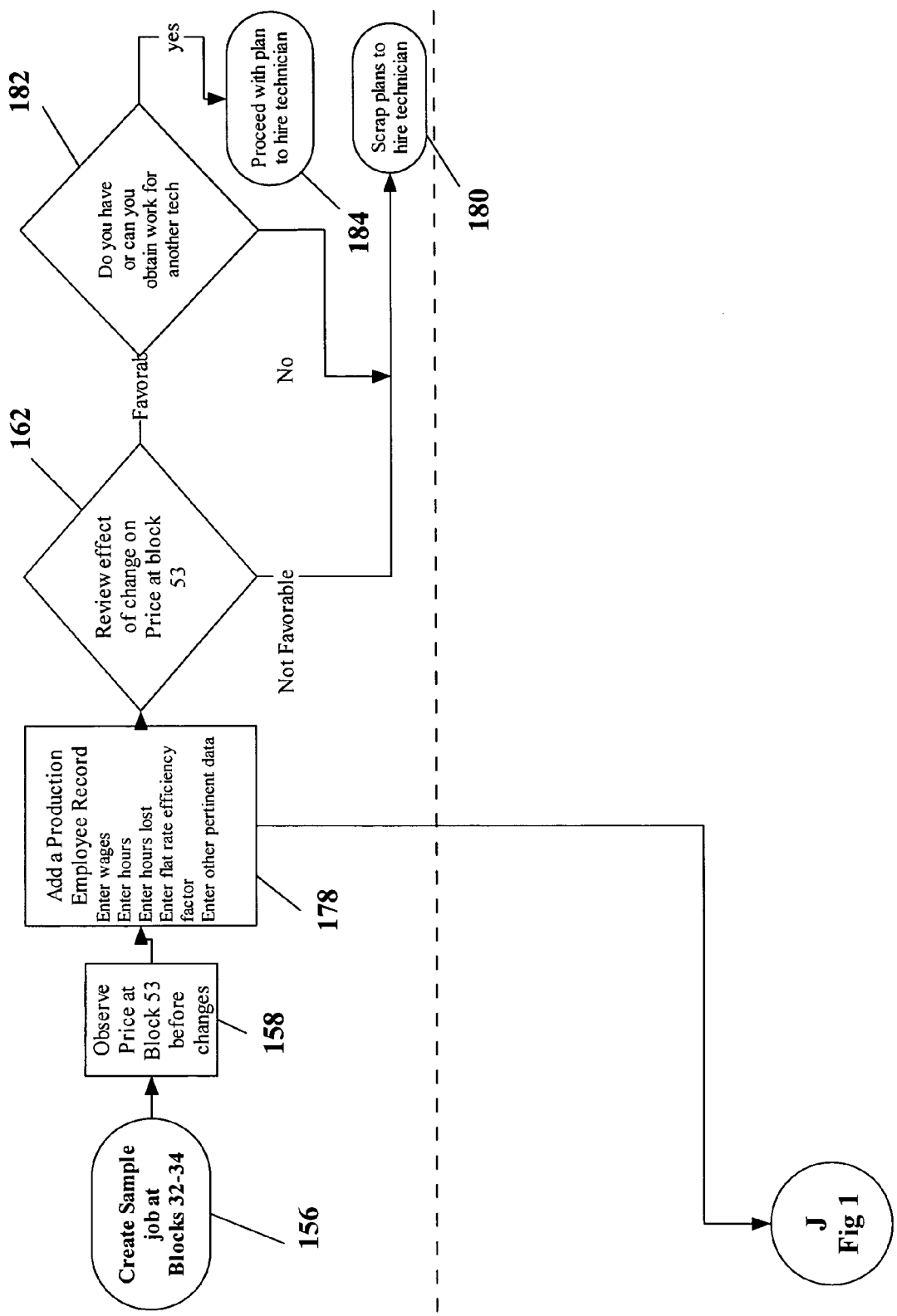
FIG. 12 is a flow chart of a method to find out how increasing production staff will effect pricing.

With reference to FIG. 12, a method to find out how increasing production staff will effect pricing is presented. Enter a production employee record that includes wages, hours, hours lost, flat rate efficiency factor and other pertinent data in entry block 178. After entering the production employee record in entry block 10, review the change in average PIF relative to price in decision block 162. If change to average PIF is not favorable, then display "scrap plans to hire technician in display block 180. If change to average PIF is favorable, ask the question," do you have or can you obtain work for another technician" in decision block 182. If the answer to the question in decision block 182 is yes, then display "proceed with plan to hire technician" in display block 184. If the answer to the question in decision block 182 is no, then display "scrap plans to hire technician in display block 180.

Figure 13:
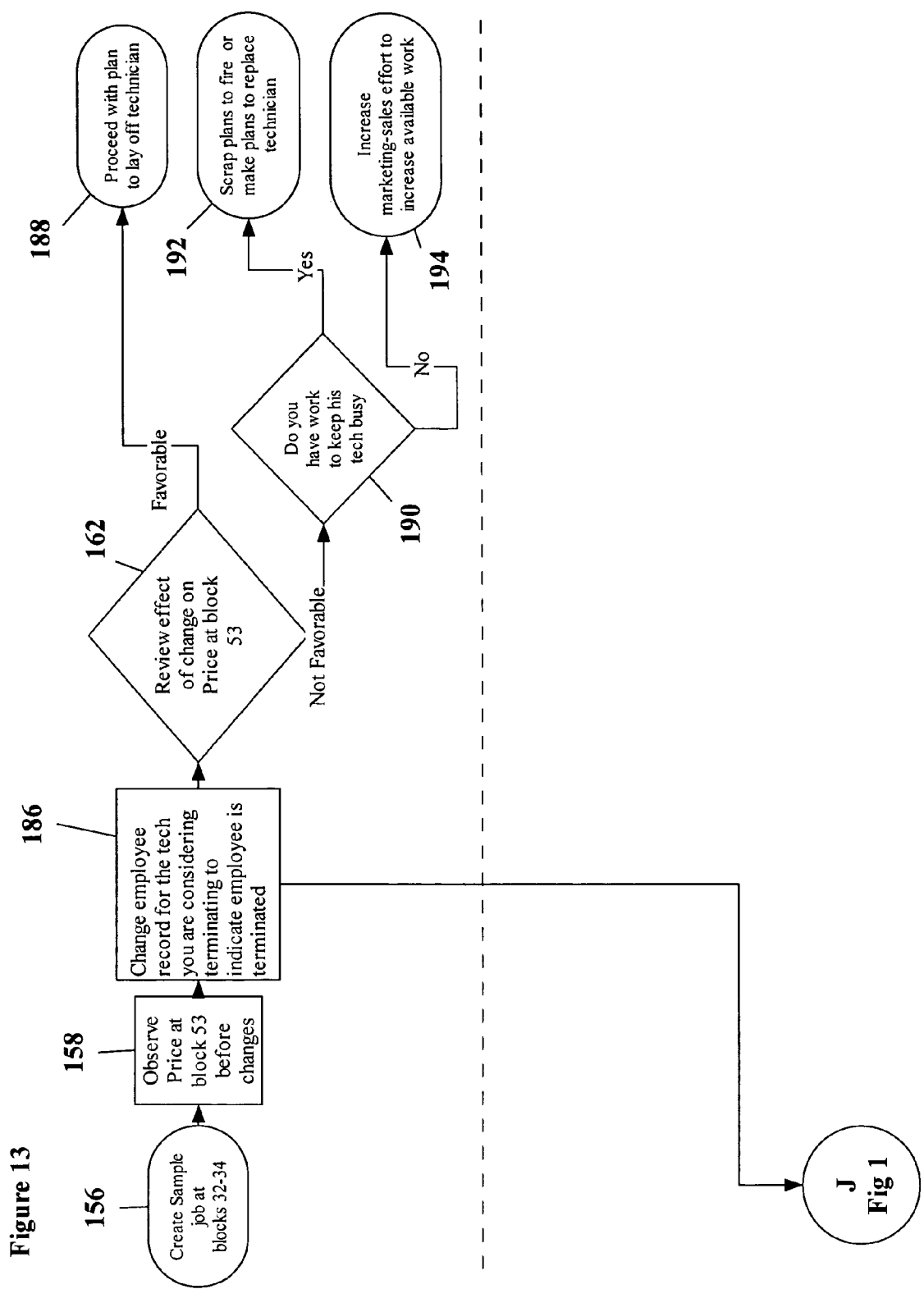
FIG. 13 is a flow chart of a method to find out how decreasing production staff will effect pricing.

With reference to FIG. 13, a method to find out how decreasing production staff will effect pricing is presented. Change employee record for a technician you are considering terminating in entry block 186. After changing the employee record in entry block 10, review the change in average PIF relative to price in decision block 162. If change to average PIF is favorable, then display "proceed with plan to lay off technician in display block 188. If change to average PIF is not favorable, ask the question," do you have work to keep this technician busy" in decision block 190. If the answer to the question in decision block 190 is yes, then display "scrap plans to fire or make plans to replace the technician in display block 192. If the answer to the question in decision block 190 is no, then display "increase marketing-sales effort to increase available work" in display block 194.

Figure 14:
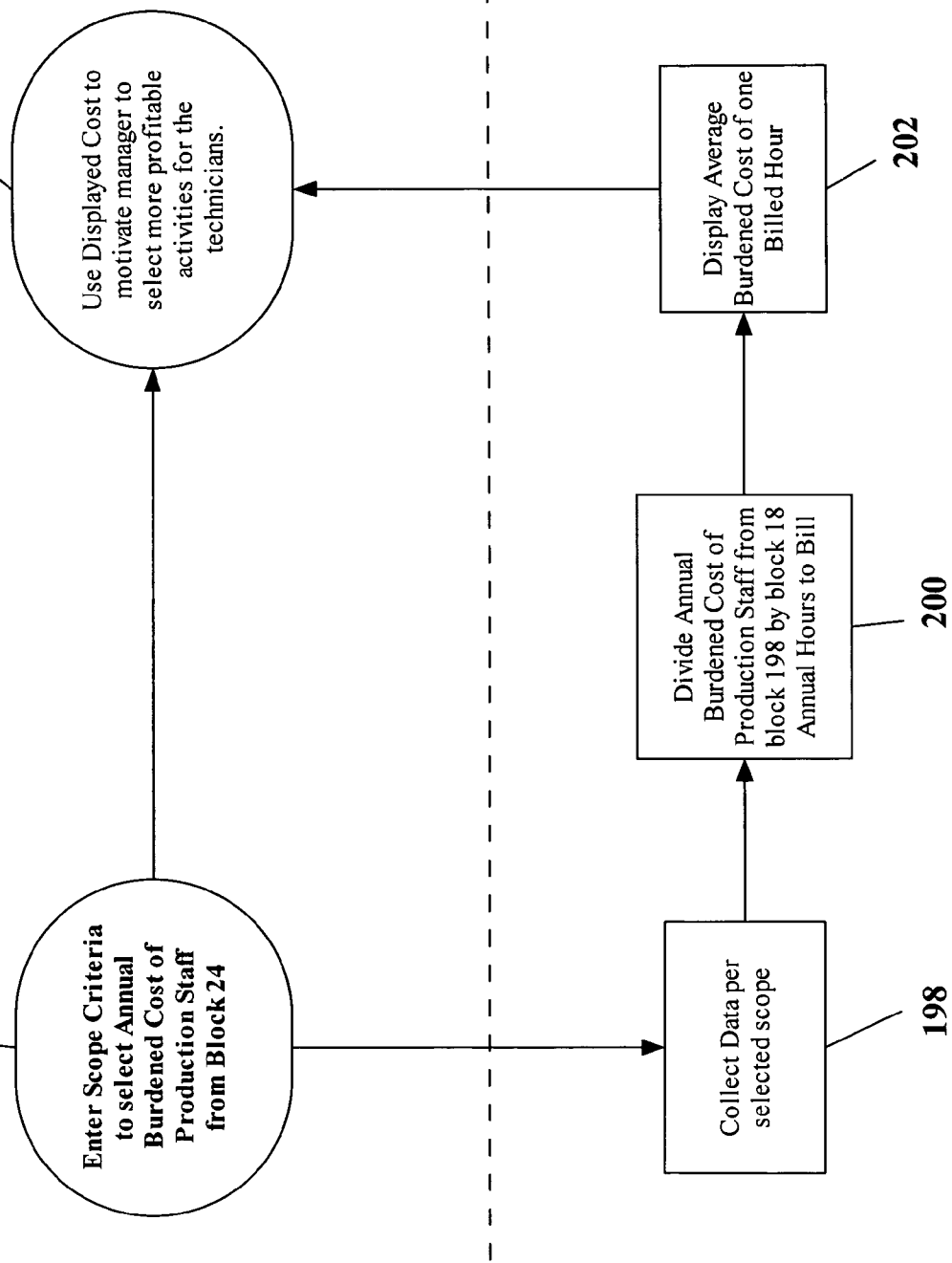
FIG. 14 is a flow chart of a method to find out the real burdened cost of billing one employee hour.

With reference to FIG. 14, a method to find out the real burdened cost of billing one technician hour is presented. Enter the burdened cost of production staff from annual budget in entry block 196. The data of burdened cost of production staff for a date ranged is collected from a storage block in process block 198. The burdened cost of production staff is divided by annual hours to bill in process block 200. The average burdened cost of one billed hour is displayed in display block 202. The average burdened cost of one billed hour is used to show a manager to select more profitable activities for technicians in display block 204.

Figure 15:
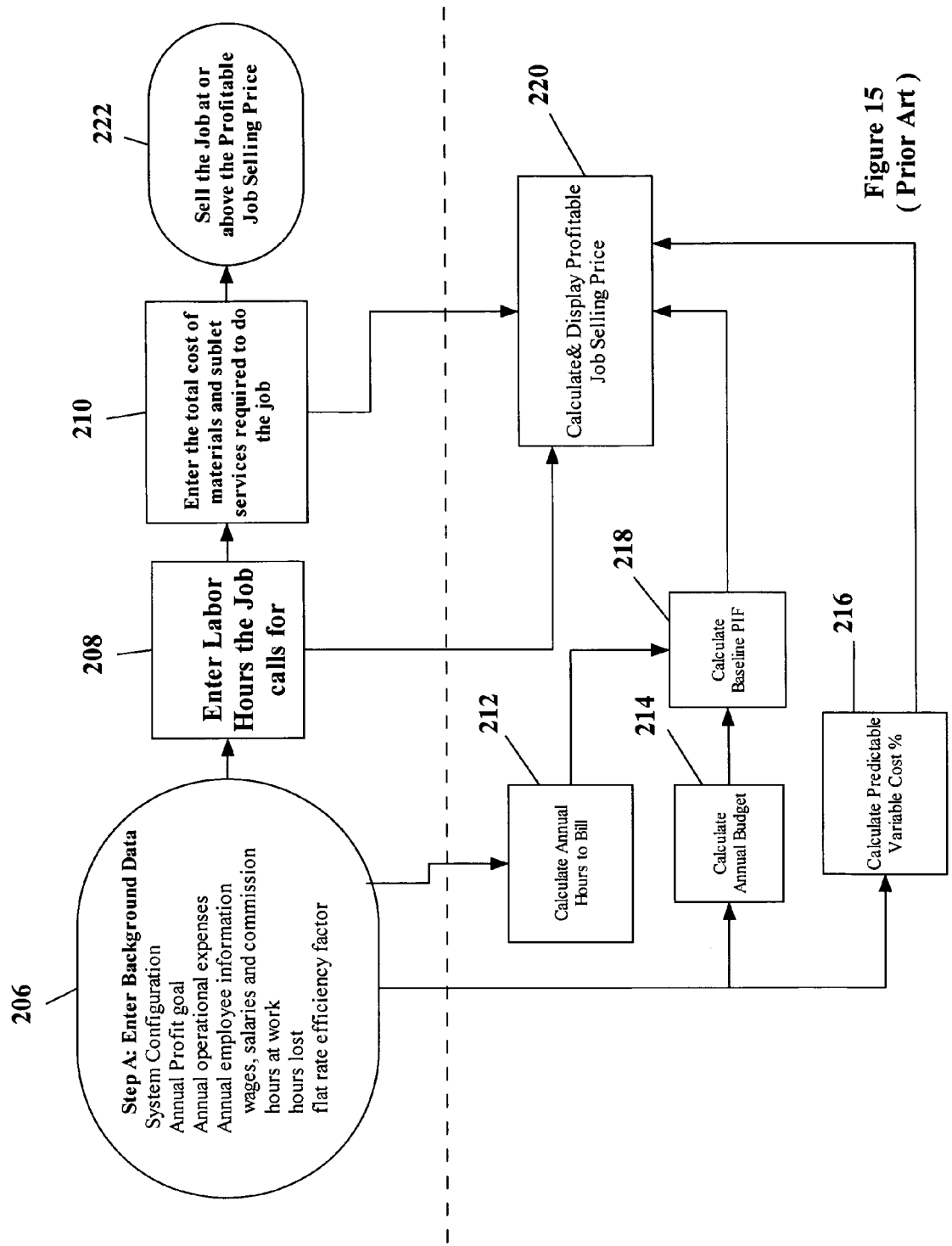
FIG. 15 is a flow chart of a prior art method for pricing service jobs to achieve or surpass a specific profit per hour target.

With reference to FIG. 15, a prior art version of a method for pricing service jobs to achieve or surpass a specific profit per hour target is presented. Background data of system configuration, annual profit goal, annual operational expenses, annual operational expenses, annual employee information, wages, salaries, commission, hours at work, hours lost and flat rate efficiency factor are entered in start block 206. Required labor hours for a job is entered in entry block 208. The total cost of materials and sublet services are entered in entry block 210. The information from start block 206 is used to calculate annual hours to bill in process block 212. The information from start block 206 is used to calculate annual budget in process block 214. The information from start block 206 is used to calculate predictable variable cost in process block 216. Baseline PIF is calculated in process block 218 using data from process blocks 212 and 214. A profitable job selling price is calculated by multiplying hours in entry block 208 by baseline PIF in process block 218, adding material and sublet services in entry block 210, adding predictable variable cost from process block 216 and displaying the profitable job selling price in process block 220. The message of "sell the job at or above the profitable job selling price is displayed in display block 222.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A computer-implemented method of projecting a target gross profit for a period of time that provides a specific net profit for operation of a business, comprising the computer-implemented steps of:

dividing annual budget by annual hours to bill to produce baseline profit index factor;

dividing average sales revenue from a specific period by annual sales revenue for the specific period to provide a seasonal sales curve percentage;

multiplying said annual hours to bill by said seasonal sales curve percentage and subtracting hours lost for said specific period to provide target hours available to bill;

multiplying said baseline profit index factor by said annual hours to bill to produce target gross profit;

subtracting said target gross profit from actual gross profit from a previous period of time to produce accumulated variance;

summing said annual budget and said accumulated variance, dividing by said target hours available to bill to produce adjusted profit index factor, said adjusted profit index factor being stored on a computer storage device of a computer and viewed on a display device of the computer;

displaying current profit index factor of at least one current transaction adjacent said adjusted profit index factor on said display device; and adjusting at least one of said target hours, hourly rate, current hours and current price of the at least one current transaction if said current profit index factor is less than said adjusted profit index factor with the result being that said current profit index factor is increased to be equal to or greater than said adjusted profit index factor.

2. The method of projecting a target gross profit for a period of time that provides a specific net profit for operation of a business of claim 1, further comprising the step of:

adding profit goal, projected fixed expenses, projected cost of sales, projected cost of administration and projected cost of production staff to provide said annual budget.

3. The method of projecting a target gross profit for a period of time that provides a specific net profit for operation of a business of claim 1, further comprising the step of:

adding all annual production staff hours at work, subtracting hours lost from said annual hours to produce net hours, dividing hours billed by hours worked to provide flat rate efficiency factor, multiplying said net hours by said flat rate efficiency to provide said annual hours available to bill.

4. The method of projecting a target gross profit for a period of time that provides a specific net profit for operation of a business of claim 1, further comprising the step of:

providing hours at work minus hours lost multiplied times said staff flat rate efficiency factor to provide annual hours to bill.

5. A computer-implemented method of projecting a target gross profit for a period of time that provides a specific net profit for operation of a business, comprising the computer-implemented steps of: providing a baseline profit index factor;

adjusting annual hours to bill for a particular period during a calendar year to provide target hours available to bill;

multiplying said baseline profit index factor by said annual hours to bill to produce target gross profit;

subtracting said target gross profit from actual gross profit from a previous period of time to produce accumulated variance;

summing annual budget and said accumulated variance, dividing by said target hours available to bill to produce adjusted profit index factor, said adjusted profit index factor being stored on a computer storage device of a computer and viewed on a display device of the computer;

displaying current profit index factor of at least one current transaction adjacent said adjusted profit index factor on said display device; and adjusting at least one of said target hours, hourly rate, current hours and current price of the at least one current transaction if said current profit index factor is less than said adjusted profit index factor with the result being that said current profit index factor is increased to be equal to or greater than said adjusted profit index factor.

6. The method of projecting a target gross profit for a period of time that provides a specific net profit for operation of a business of claim 5, further comprising the step of:

dividing said annual budget by said annual hours to bill to produce baseline profit index factor.

7. The method of projecting a target gross profit for a period of time that provides a specific net profit for operation of a business of claim 5, further comprising the steps of:

dividing average sales revenue from a specific period by annual sales revenue for the specific period to provide a seasonal sales curve percentage; and multiplying said annual hours to bill by said seasonal sales curve percentage and subtracting hours lost for the specific period to provide said target hours available to bill.

\* \* \* \* \*